United States Patent
Shimizu

(10) Patent No.: US 7,038,707 B2
(45) Date of Patent: May 2, 2006

(54) IMAGE FORMING APPARATUS AND CONTROL METHOD THEREOF

(75) Inventor: Haruo Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 10/736,628

(22) Filed: Dec. 17, 2003

(65) Prior Publication Data

US 2004/0165057 A1 Aug. 26, 2004

(30) Foreign Application Priority Data

Dec. 26, 2002 (JP) ............................. 2002-378683

(51) Int. Cl.
*B41J 2/47* (2006.01)
(52) U.S. Cl. .................................................... 347/253
(58) Field of Classification Search ................ 347/131, 347/144, 240, 251–254; 358/1.9, 3.03, 3.06, 358/3.1, 3.09; 359/891; 399/180–181
See application file for complete search history.

(56) References Cited

U.S. PATENT DOCUMENTS

| 5,565,995 A | * | 10/1996 | Yamada et al. ............ 358/3.02 |
| 5,999,202 A | * | 12/1999 | Tanaka et al. ............... 347/144 |
| 6,751,346 B1 | | 6/2004 | Shimizu ..................... 382/162 |
| 2001/0055129 A1 | | 12/2001 | Shimizu ..................... 358/520 |
| 2003/0179396 A1 | * | 9/2003 | Ishizuka et al. ............. 358/1.9 |

* cited by examiner

*Primary Examiner*—Hai Pham
(74) *Attorney, Agent, or Firm*—Fitzpatrick, Cella, Harper & Scinto

(57) ABSTRACT

In a case of recording (printing) an image including texts and thin lines, the image is printed with an intended thickness without causing a crack in the thin lines. When the CAD mode is OFF in the apparatus proposed by this invention, assuming a pixel value indicative of a printing color component is 8 bits and the maximum value is 255, the value is reduced to, e.g., 90%, before halftoning is performed, and image forming is performed in accordance with the characteristic curve 751 which specifies the relation between the halftoning-processed data and the amount of exposure light. On the contrary, when the CAD mode is ON, halftoning is performed without reducing the pixel value indicative of a printing color components, and image forming is performed in accordance with the characteristic curve 753 which specifies the relation between the halftoning-processed data and the amount of exposure light.

12 Claims, 22 Drawing Sheets

METHOD UTILIZING HUMAN PERCEPTION

METHOD SHARING OVERLAPPING PORTION

METHOD ATTEMPTING NOT TO CHANGE SATURATION

GRADATION DITHER

CORRESPONDING TO 107 LINES
(GENERAL 45° SCREEN)

VERTICAL DITHER

CORRESPONDING TO 150 LINES

CORRESPONDING TO 150 LINES

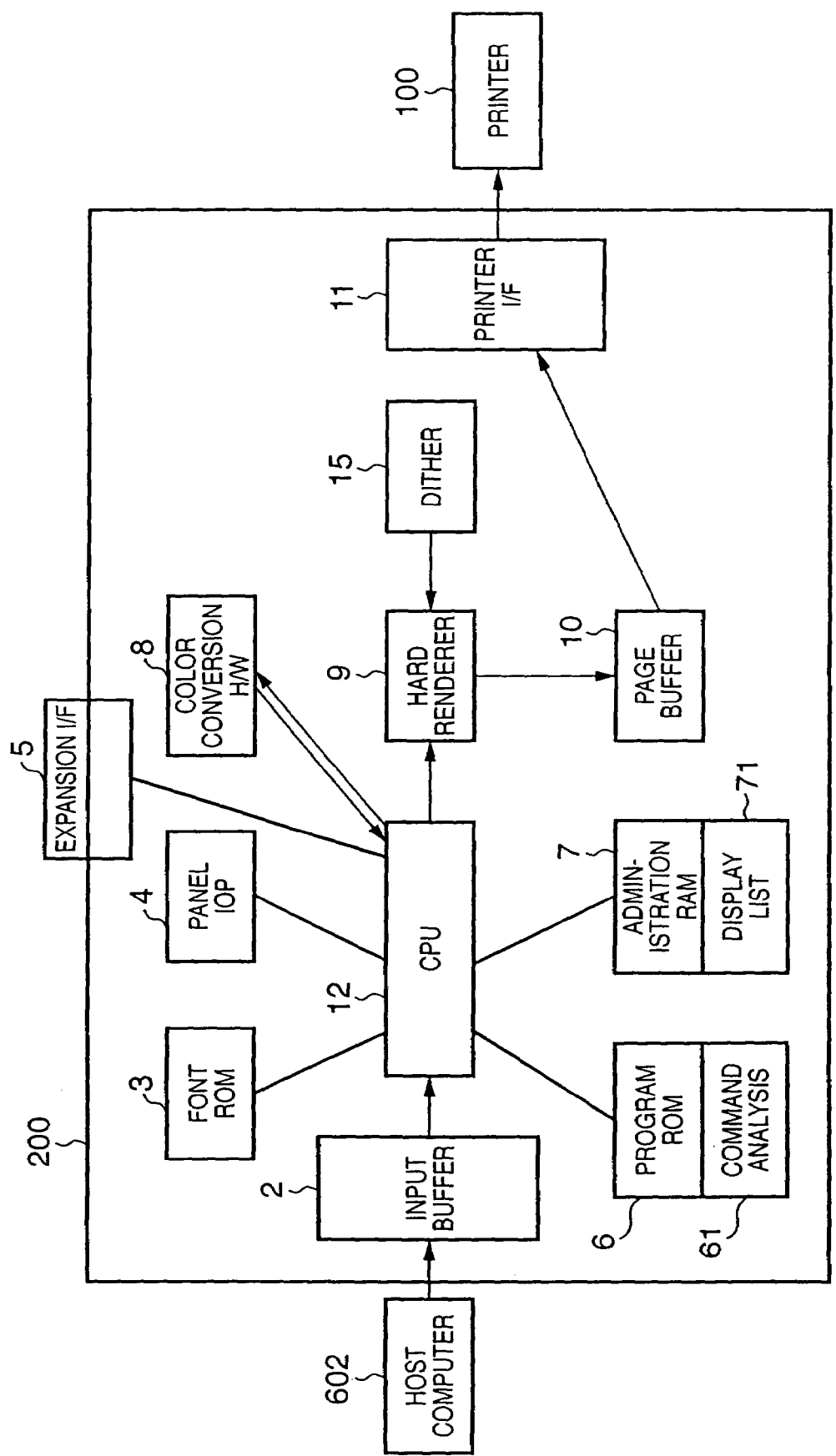

F I G. 10
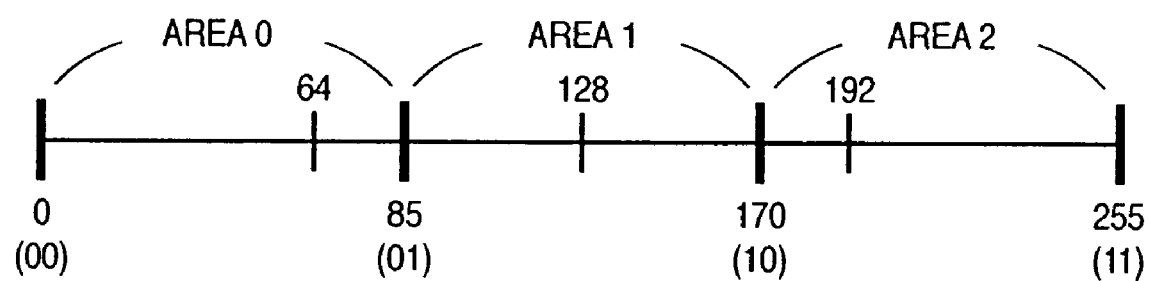

FIG. 11

| 180 | 60 | 100 | 125 |
|---|---|---|---|
| 166 | 130 | 60 | 115 |
| 128 | 190 | 90 | 203 |
| 106 | 80 | 87 | 77 |

INPUT DATA

FIG. 12

| 74 | 53 | 32 | 80 |
|----|----|----|----|
| 23 | 5  | 11 | 58 |
| 45 | 21 | 16 | 37 |
| 55 | 43 | 64 | 85 |

FIG. 13B

| 0 INPUT | 0,0 | 0,1 | 0,2 | 0,3 | 1,0 | ----- | 3,0 | 3,1 | 3,2 | 3,3 |
|---|---|---|---|---|---|---|---|---|---|---|
| 255 INPUT | 0,0 | 0,1 | 0,2 | 0,3 | 1,0 | ----- | 3,0 | 3,1 | 3,2 | 3,3 |

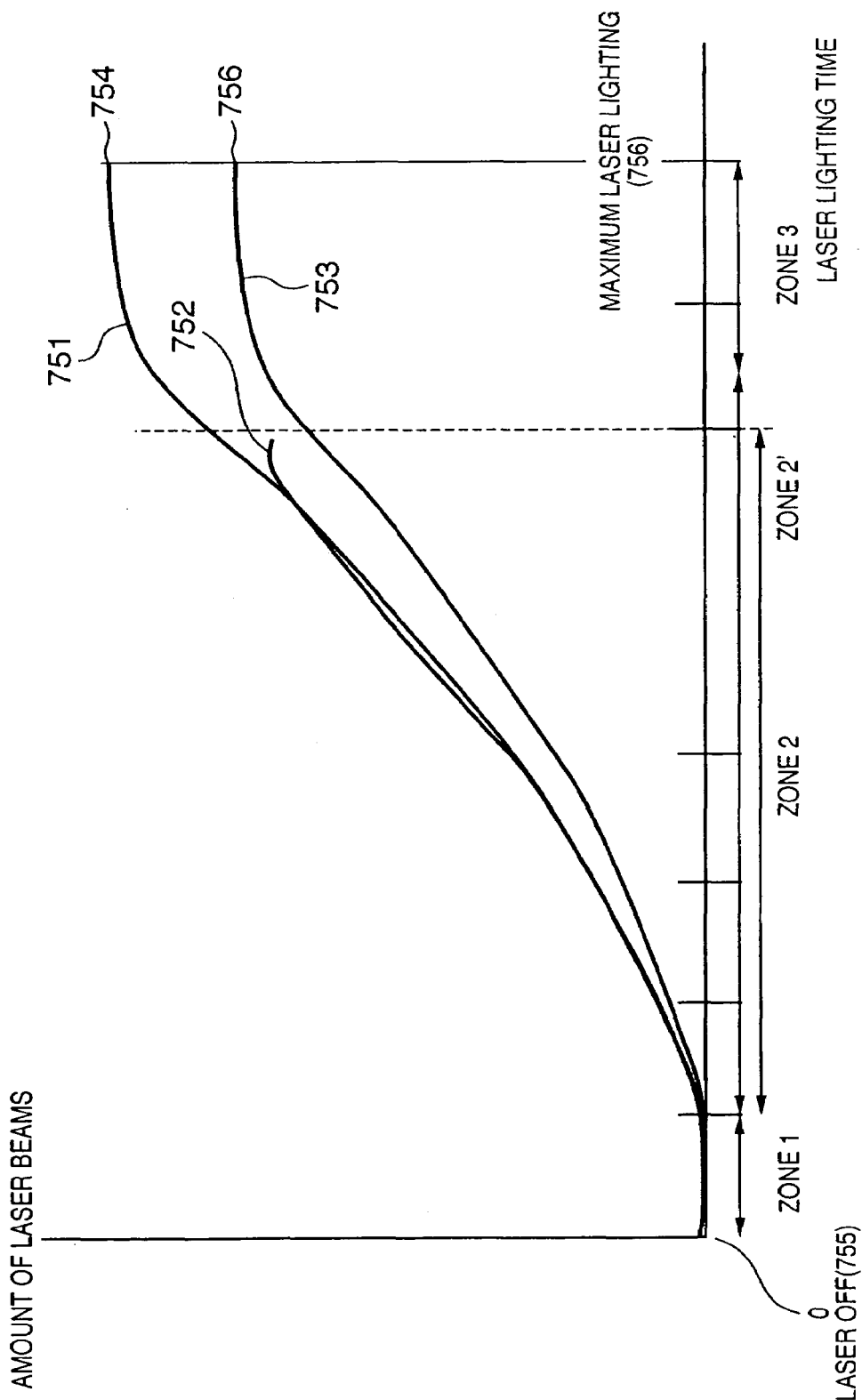

IMAGE FORMING APPARATUS AND CONTROL METHOD THEREOF

FIELD OF THE INVENTION

The present invention relates to an image forming technique for printing a color image on a printing medium, e.g., printing paper, by an electrophotography method.

BACKGROUND OF THE INVENTION

In general, printing data whose printing is designated by an application program (CAD, word processing, DTP or the like) operating in a general-purpose data processing apparatus, e.g., a workstation (WS), a personal computer (PC) or the like, is expressed broadly by three object types: texts, halftone images such as photograph images, and graphics.

Texts include alphanumeric characters expressed by 1-byte codes, and characters like kanji (Chinese ideograms) expressed by 2-byte codes. Halftone images are constructed with color data arranged in two dimensions, which is different for each pixel. To increase transfer efficiency, halftone images are sometimes compressed. Graphics are expressed by lines, polygonal outlines, and filling areas.

Printing apparatuses adopting an electrophotography process have the following problem, which imposes a challenge in printing a clear thin line.

To print R, G, and B data designated by a PC, the data is converted to respective color data of cyan (C), magenta (M), yellow (Y) and black (K) in electrophotography method, and printing is performed by using toner that corresponds to the respective values. In the electrophotography method, for instance, in a case of printing a full secondary-color image with R=255, G=0 and B=0, printing is generally performed with Y+M (the total of 200% of Y and M, and 0% of C and K). However, in the process of image development and transfer, a phenomenon called toner spattering occurs, resulting in a blurred outline thicker than an actual line.

To solve this problem, for instance, in a case of printing an image with pure red color after RGB data is converted to YMCK data, it is a general procedure for a printer controller to perform printing with 90% Y and 90% M (Y, M=255×0.9≈230), i.e., the total of 180% data.

Even though the total value of C, M, Y and K is 180% toner adhesion amount, in a case of printing a large area, dot omission does not cause a big problem. However, in a case of printing a thin line (e.g., having a thickness of one or two dots), if the digital data is processed to 180% as described above, the thin line may be printed as a cracked line instead of a solid line after halftoning (dither, error diffusion and the like) is performed. In other words, data expressed as a solid line on a monitor will likely be printed as a cracked line, causing a problem.

A simple solution for solving this problem is to increase the thickness of the thin line to be thicker than a designated size, or to darken the color of the line to be darker than a designated color, thereby preventing a crack in the line. However, this is not a perfect solution of the problem because it is not exactly what the user has intended.

SUMMARY OF THE INVENTION

The present invention has been proposed in view of the above-described problem, and has as its object to provide a technique of printing an image, such as a text, a thin line or the like, with an intended thickness without causing a crack in the line.

In order to solve the above-described problem and attain the object, the control method of an image forming apparatus according to the present invention has the following steps.

That is, a control method of an image forming apparatus which forms a color image on a predetermined printing medium by an electrophotography method, comprising a first image forming step of forming an image by performing halftoning while reducing a pixel value indicative of a printing color component at a predetermined rate, a second image forming step of forming an image by performing halftoning without reducing a pixel value indicative of a printing color component, while reducing an amount of exposure light used in the electrophotography method at a predetermined rate, a determining step of determining whether or not a thin-line-emphasis image forming is designated, and a control step of controlling the apparatus to perform image forming by either the first image forming step or the second image forming step, based on a determination result of the determining step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a block diagram showing a printer controller of a printing apparatus according to the embodiment;

FIG. 10 is an explanatory view of an algorithm for quantizing 8-bit data to 2-bit data according to the embodiment;

FIG. 11 shows an example of input image data subjected to dither processing;

FIG. 12 shows an example of a dither matrix;

FIG. 13B is a view showing contents of a lookup table used in dither processing according to the embodiment;

FIG. 15 is a graph showing a relation between input data and a laser beam according to the embodiment;

DETAILED DESCRIPTION OF THE PREFERRED EMBODIMENTS

Preferred embodiments of the present invention will now be described in detail in accordance with the accompanying drawings.

Note that this embodiment will describe color space matching and halftoning as the typical example of processing performed on various object types in color printing. Furthermore, CAD mode (thin-line emphasis) processing will be described as the processing applied to the entire surface of an object. A printing mode is selected from a number of printing modes in a setting screen of a printer driver, which is displayed on a PC when printing is designated. The printer driver adds data, such as a command indicative of a selected printing mode, to the head of the printing data, and outputs it to the PC.

Figure 5A:
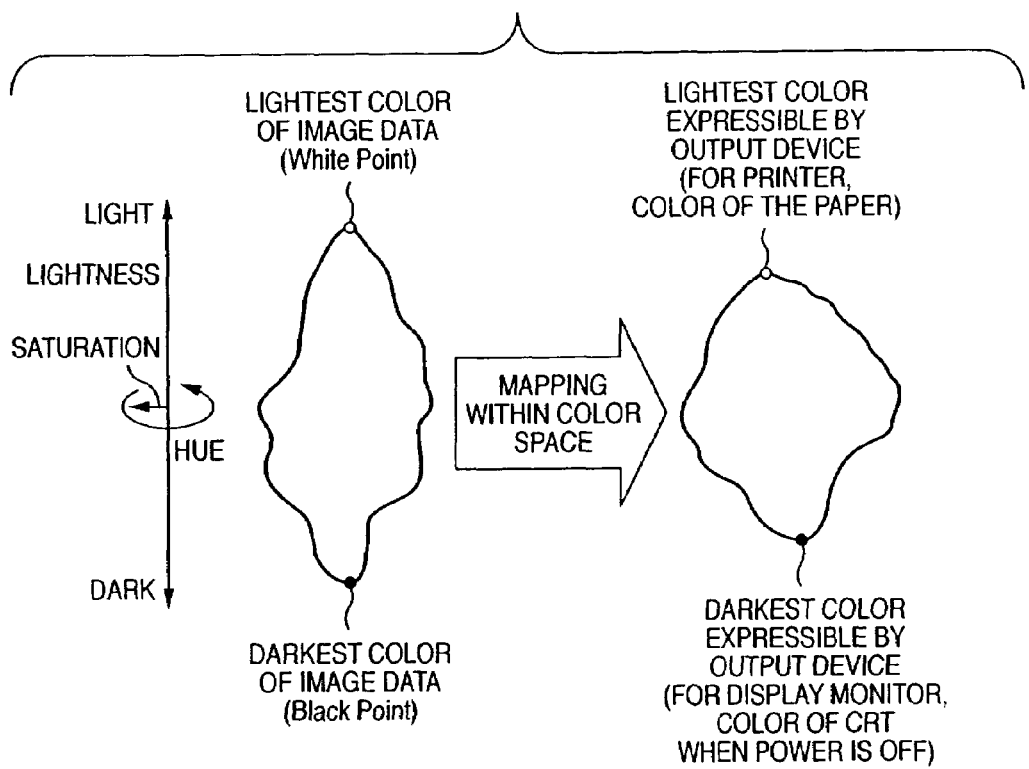
FIG. 5A is a conceptualized view of color space conversion.

The "color space matching" is to perform appropriate color processing at the time of printing various objects displayed on a display device, such as a CRT, and to convert colors that are calibrated for an input device, e.g., a scanner, or a display device, e.g., a CRT, to an output apparatus, since a color reproduction range of a CRT is smaller than a color reproducing range of a printer. Various color space matching techniques have been proposed. Some of them will be described with reference to FIGS. 5A to 5D. FIG. 5A shows a relation between an input color space and an output color space.

Figure 5B:
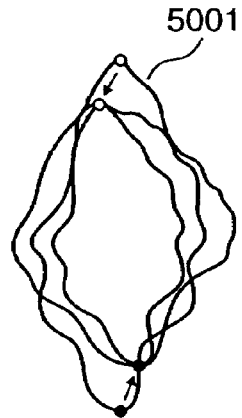
FIG. 5B is a conceptualized view of color space conversion in a color emphasis mode.

1) Perceptual Match (Color Emphasis): 5001 in FIG. 5B

The lightest color (white point) and the darkest color (black point) of the image data are matched to those of the output device. Other colors are converted accordingly so as to maintain relative relations with the white point and black point. Although all colors used in the original image are converted to different colors, the relationship among colors is maintained. Therefore, this processing is appropriately used in natural images and photographic images having a large number of colors.

Figure 5C:
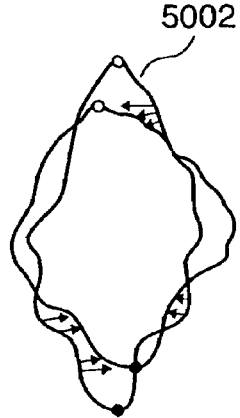
FIG. 5C is a conceptualized view of color space conversion in a minimum color difference mode.

2) Colorimetric Match (Minimum Color Difference): 5002 in FIG. 5C

Color conversion is not performed on a portion where the gamut of the image data overlaps the gamut of the output device. The portion outside the gamut-overlapping area is mapped to the outer edge of the printer gamut without changing the lightness. This processing is appropriately used for expressing colors faithfully, e.g., in a case of printing a logo, reproducing a color to match a color sample, and the like.

Figure 5D:
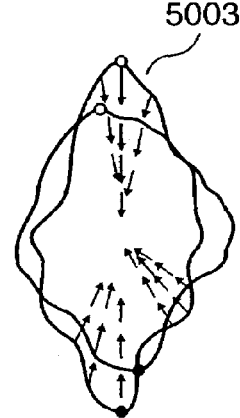
FIG. 5D is a conceptualized view of color space conversion in a vividness emphasis mode.

3) Saturation Match (Vividness Emphasis): 5003 in FIG. 5D

A color space of the portion outside the gamut is compressed without preferably changing (deteriorating) the saturation. This processing is appropriately used for an image having a high saturation, e.g., CG images, images used for presentation and the like.

4) No Conversion

Color conversion is not performed. Color data designated by an application program is transmitted as it is to the printer. In this mode, data which does not require color precision can be printed at high speed since no conversion processing is performed.

In actual color space matching, a printer gamut is calculated using several typical sample data, and a matching parameter is calculated by simulation.

In view of the above-described characteristics, a default color matching characteristic for respective objects is set as defined below in Table 1:

TABLE 1

| texts | none |
| graphics | vividness emphasis |
| images (halftone images) | color emphasis |

Next, the "halftoning" technique is described. Halftoning is to perform aforementioned color space compression on an inputted full-color image, execute color conversion to YMCK which is a printer color space, and map the data to the printer's color precision (e.g., 1, 2, 4, or 8 bits for each color). Various halftoning techniques have been proposed. The error diffusion technique and dither processing are typical examples.

1) Error Diffusion Technique

When a pixel is quantized to an output bit number, a quantization error between the inputted pixel and a threshold value used in quantization is diffused to neighboring pixels at a certain ratio, thereby maintaining the density. In this technique, a cyclical noise pattern that can be seen in dither processing does not appear and excellent image quality can be achieved. However, there is a problem in terms of processing speed compared to the dither method. Further, it is difficult to apply error diffusion technique to various objects inputted to random positions in random orders, e.g., PDL data, because of the processing speed and proper processing of image overlaps. However, the error diffusion technique is appropriately employed by the type of printers discharging ink liquid, in which document rendering is executed by a host unit and the document is sequentially transferred to the printer as an image.

2) Dither Method

This method is to express a tone by a plurality of pixels as a group. The typical example includes a dispersed dither method and a clustered dither method. The former disperses a cyclical pattern of the dither. The latter, on the contrary, concentrates the dots in dithering. In other words, from the aspect of the number of screen lines, the number of lines is larger in the dispersed dither than the clustered dither. In the electrophotography method, the clustered dither is often employed because the dot reproducibility in high resolution (e.g., 600 dpi) is poor in the dispersed dither.

Furthermore, recently a method called Bluenoise mask technique is used. In this method, a random pattern similar to that of the error diffusion technique is realized by enlarging a dither matrix size to, e.g., 256×256. Distinguishing one from another is sometimes meaningless.

Figure 6A:
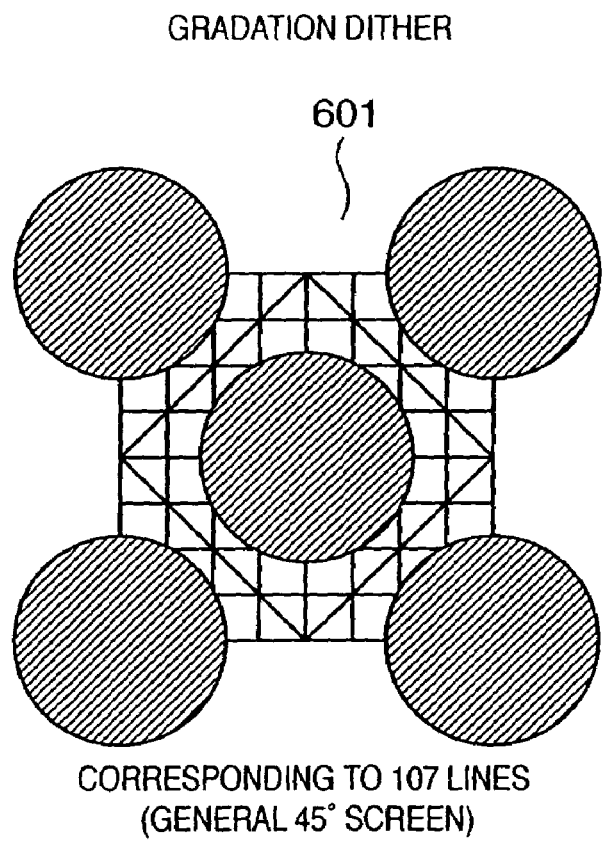
FIG. 6A shows a characteristic of a gradation dither.
Figure 6B:
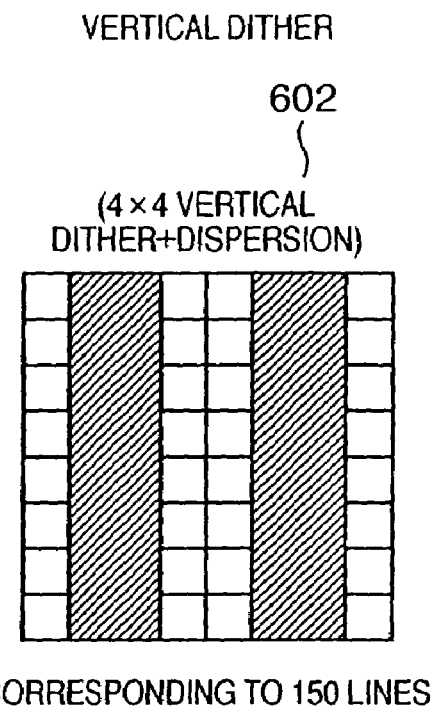
FIG. 6B shows a characteristic of a vertical dither.
Figure 6C:
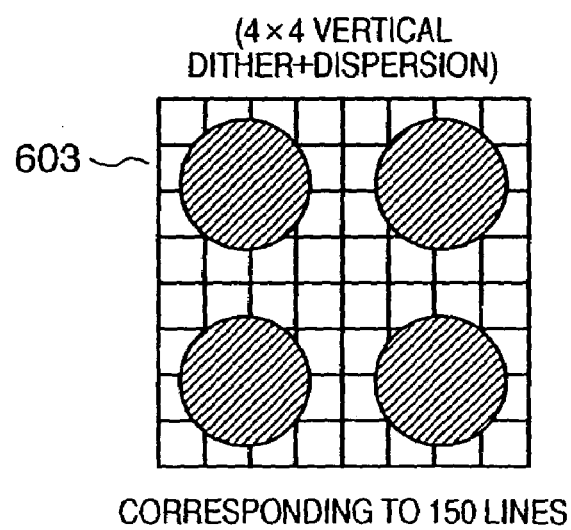
FIG. 6C shows a characteristic of a resolution dither.

Next, the clustered dither is described with reference to FIGS. 6A to 6C.

For a simple description, assume that the dither matrix has an 8×8 size and one dot has 600 dpi resolution. FIGS. 6A to 6C are schematic views of respective dithers, showing a dot pattern expressing a 50% density level.

Gradation Dither (FIG. 6A): The dither 601, having 45° screen angle as shown in FIG. 6A, is close to a commonly used commercially available halftone-dot printing. The number of screen lines that corresponds to a dither cycle is 107. This pattern is most appropriately used in black and white printing. In color printing, respective color plates of Y, M, C, and K are superimposed for printing. If the plates are mechanically deviated due to a registration error of respective colors, colors are mixed, generating a moiré pattern or resulting in a dull color.

Vertical Dither (FIG. 6B): The dither 602 grows dither patterns in the sub-scanning direction of the printing as shown in FIG. 6B. In particular, the dither is appropriately used to solve a problem of significant registration errors, caused by the electrophotography process. The number of screen lines is 150 as shown in FIG. 6B. Therefore, a high-resolution image can be expressed. On the contrary, gradation is poor compared to the gradation dither shown in FIG. 6A. In a case where a thin vertical halftone line (1 or 2 dots) is rendered, the line may completely overlap the dither's off cycle (white vertical line) and may not be printed.

Resolution Dither (FIG. 6C): The dither 603 has an intermediate characteristic of the gradation dither 601 and vertical dither 602.

Advantages and disadvantages of the aforementioned three dithers are shown in Table 2.

TABLE 2

|  | gradation dither | vertical dither | resolution dither |
| --- | --- | --- | --- |
| number of lines | 107 (Δ) | 150 (○) | 150 (○) |
| gradation | ○ | Δ | Δ |
| color stability | X | ○ | Δ |
| thin line expression | X | Δ | ○ |

○ excellent,
Δ fair,
X poor

In view of the above characteristics, the most appropriate dither for each object is shown in Table 3. For texts and graphics, a dither having a large number of lines and having a high resolution is appropriate. For halftone images, the gradation dither which improves tonality is appropriate.

TABLE 3

| texts | resolution (vertical) dither |
| images | gradation dither |
| graphics | resolution dither |

Tables 1 and 3 show the default setting of color space matching and halftoning appropriate for respective objects. However, the printing result using this setting is not always the best for all printing data. Therefore, the setting is changed in accordance with a problematic pattern, and color space matching and halftoning are performed on all objects in the entire page.

Next, the technique of printing a line without a crack, which is the main subject of the present invention, is described.

Pulse Width Modulation (PWM) in a laser beam printer employing an electrophotography method is to perform modulation on, e.g., a pixel having 600 dpi, in the laser's main scanning direction, thereby changing a laser beam emission time in sub-pixel unit, and ultimately controlling the amount of laser beams and pixel density. More specifically, as indicated by the characteristic curve 751 in FIG. 15 representing a laser lighting time versus an amount of laser beams, the laser lighting time (abscissa) within one pixel is digitally controlled, and the amount of laser beams (ordinate) actually emitted to the drum surface (106) is controlled. In the non-CAD mode, basically the amount of laser beams changes according to this characteristic.

As shown in FIG. 15, in the zone where the laser-ON time is short, the laser does not start (sufficient laser oscillation does not occur). Therefore, the amount of laser beams emitted to the drum surface (106) is close to a 0 level (zone 1). As the pulsewidth inputted to the laser diode increases, the amount of laser beams on the drum surface increases proportionally (zone 2). As the pulsewidth increases further, the amount of laser beams saturates (zone 3).

Conventionally, to print full red (e.g., 90% magenta and 90% yellow) by a printer having, e.g., 600 dpi and 1-bit tone for each of Y, M, C and K, with the use of the characteristic curve 751 in FIG. 15, the dots of the maximum lighting in zone 3 and areal tonality representation (dither) are used. Since secondary color R cannot be printed with 200% data because of the engine limitation as mentioned above, the secondary color is realized with 180% toner adhesion amount at the most in RGB to CMYK conversion.

Figure 16A:
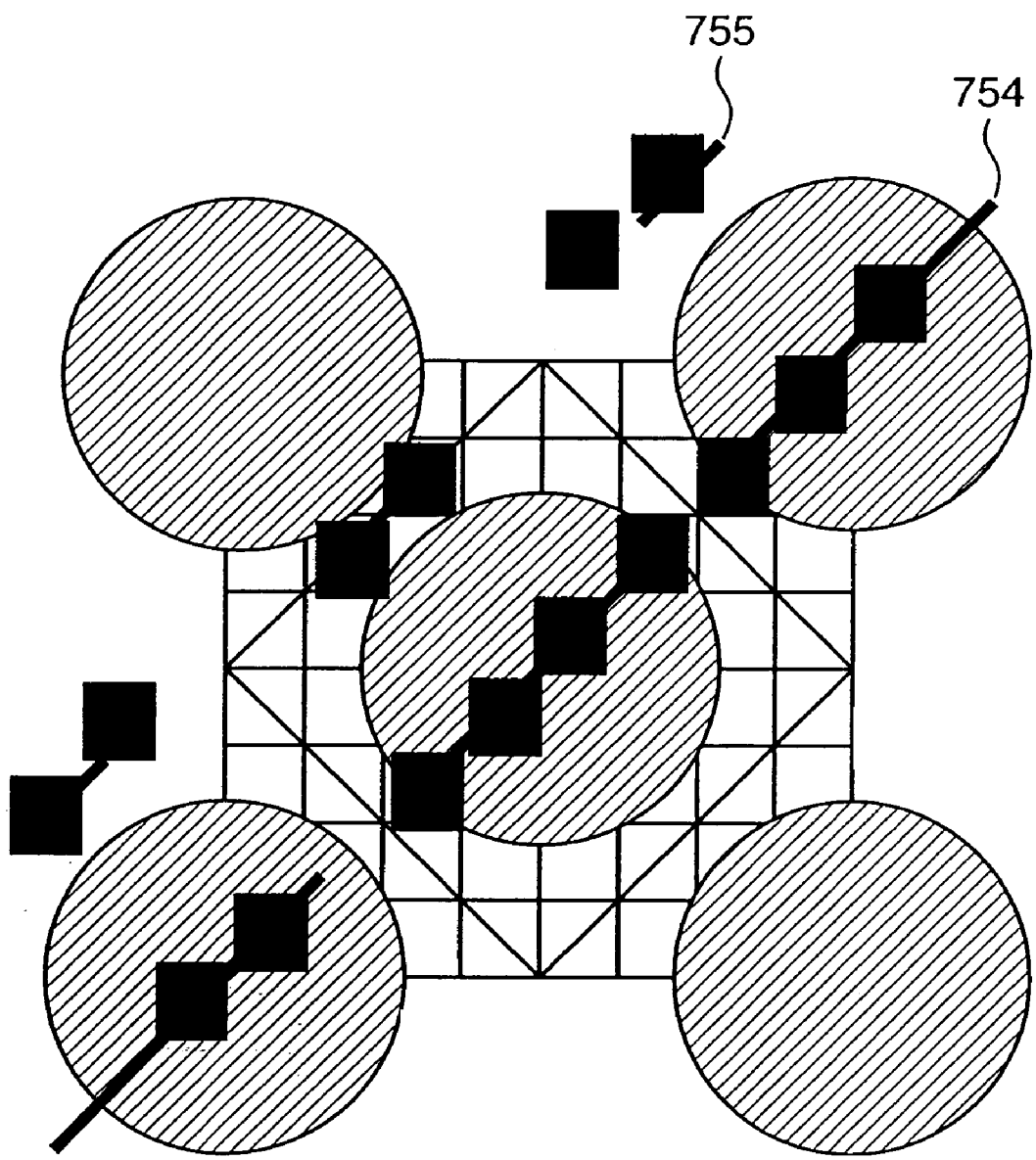
FIG. 16A shows an example in which a thin line is cracked after dither processing is performed.

In other words, pixel data is converted to 90%. Therefore, for instance, in a case where a line having a 1-dot width and 90% density is drawn as shown in FIG. 16A, a line close to a solid line can be drawn if the line matches the dither cycle (754). However, if the phase is deviated from the dither center (755), the line will likely be printed with a crack. The reason thereof is described in more understandable terms. For instance, in a case where the printing color component M is expressed by 8 bits and has the maximum value 255, 255 is multiplied by 0.9, resulting in 230. This value may fall below a threshold value by chance after dither processing is performed, and it causes a crack in the line.

On the contrary, according to this embodiment, when the CAD mode is ON, the amount of laser beams at the maximum lighting is reduced (e.g., reduced to 80% at the maximum lighting) as indicated by the characteristic curve 753 representing a laser pulsewidth versus an amount of laser beams, and the data obtained by RGB to YMCK conversion is used without any processing. Note that controlling the amount of laser beams is realized by controlling a laser device driver.

As a result, even if halftoning such as dither processing is performed, pure red can be printed with Y and M components having the maximum value 255. Therefore, whatever the dither threshold value in the dither processing, it is assured that the data will exceed the threshold value. Therefore, dot omission can be prevented, i.e., it is possible to prevent a crack in a thin line.

According to the present embodiment, when an operator designates the CAD mode (thin-line emphasis mode), the following effects can be achieved and the conventional problem can be solved:

toner spattering can be prevented in an image-forming process; and a solid line can likely be printed without a crack in digital image processing.

Figure 16B:
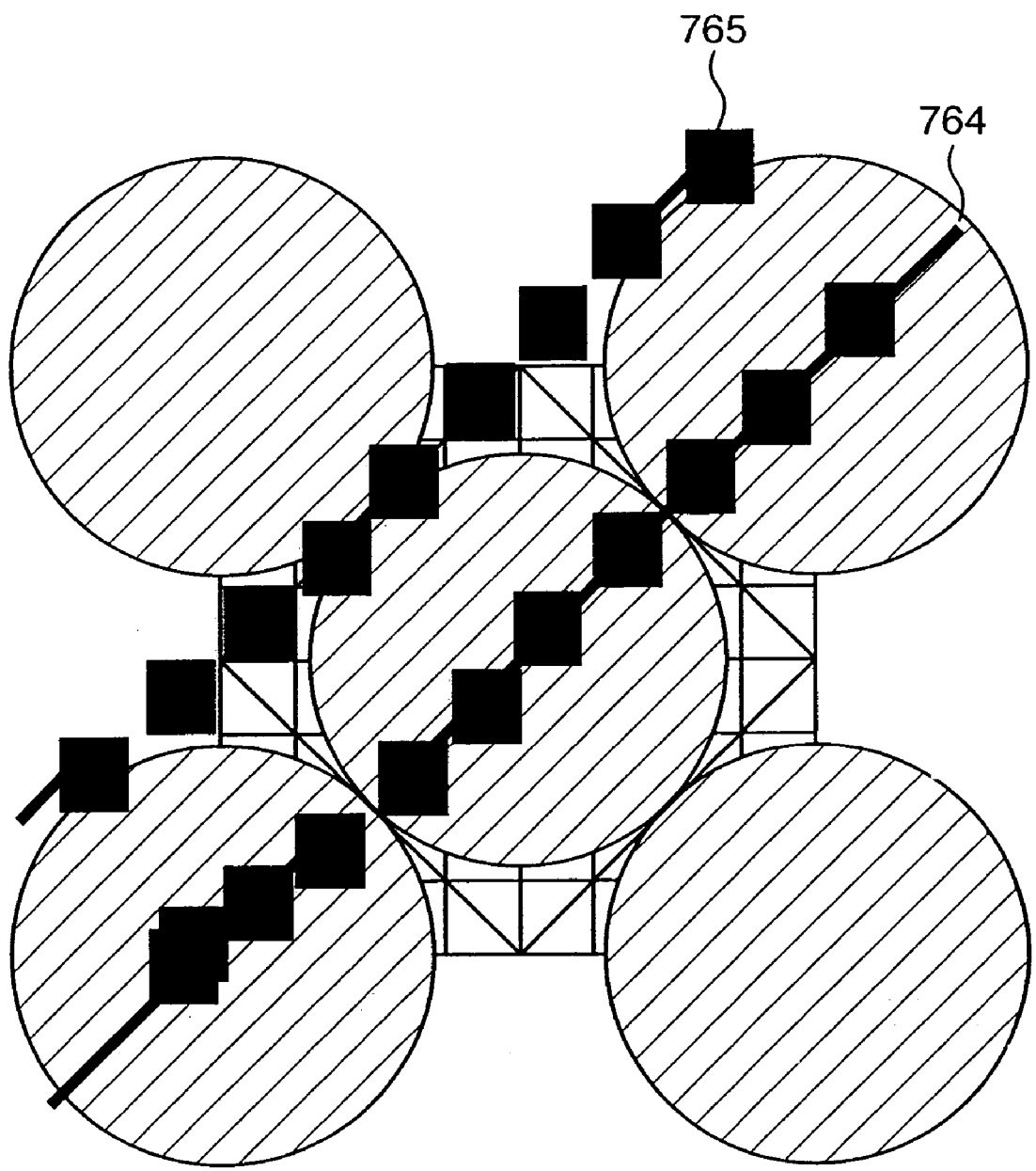
FIG. 16B shows a state of a thin line when dither processing according to the embodiment is performed.

This example is shown in FIG. 16B. In this example, all ON dots are printed with, e.g., 80% of the maximum lighting, and the secondary color red in RGB is digitally expressed by Y dots and M dots all being ON with 180% light-amount data (764). As can be seen from FIG. 16B, although the density in dot unit declines from the aspect of microscopic view, the line as a whole is printed as a smoother solid line than the line 754 in FIG. 16A.

However, as can be seen from the light amount characteristic, the overall dynamic range (OFF-ON ratio) declines. Therefore, a declined tonality and increased roughness may result in photographic images. In other words, this algorithm is preferably applied to graphics mainly using lines, and small texts.

Figure 17A:
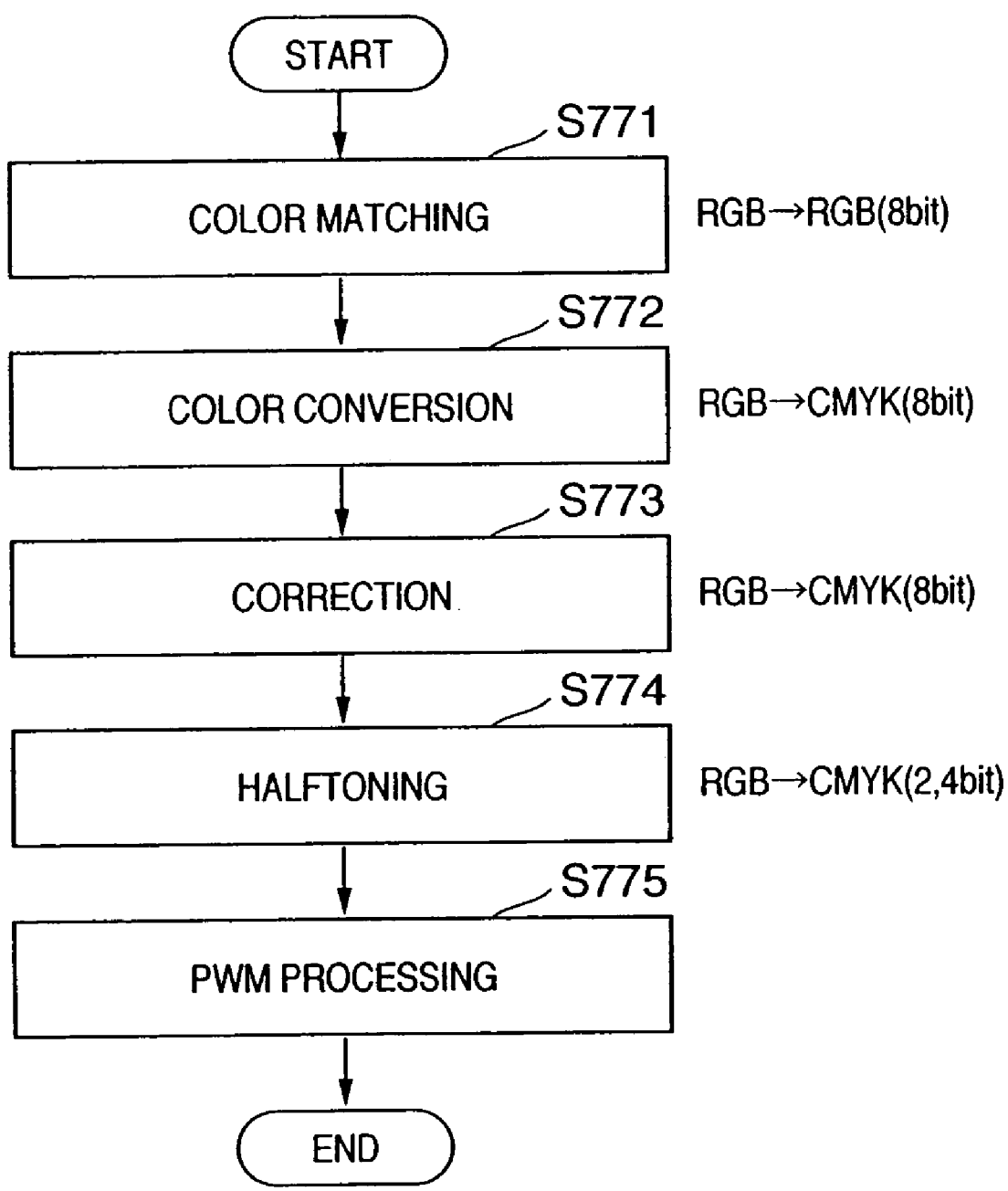
FIG. 17A is a flowchart showing a processing procedure of a printer controller according to the embodiment.

Next, an algorithm of digital signal processing (from RGB input to video data transfer to the engine) in a printer controller using PDL, related to the present embodiment is described with reference to the flowchart in FIG. 17A.

In step S771, CMS color matching (RGB to RGB) conversion according to the type of objects (texts, graphics, images) is performed with the vividness emphasis for texts and the tonality emphasis for images. In step S772, color conversion is performed from signals in the monitor's color system (RGB) to signals in the printer's color system (YMCK). Herein, nonlinear processing (in general, conversion using a three-dimensional look-up table (LUT) for a higher conversion speed is performed) is realized, taking the color reproduction area of the device and limitation of the total toner adhesion amount (e.g., 170% for a secondary color, 230% for a quartic color) into consideration.

Since a printer employing the electrophotography method has a large density variation for the obtained YMCK signals, in step S773, one-dimensional LUT conversion (YMCK 8 bit to YMCK 8 bit) is performed for each color of Y, M, C and K. The conversion is executed to eliminate density differences caused by density changes over time or an environmental change, thereby absorbing the density variation.

In step S774, halftoning (HT) is executed to reduce the tone to the number of output bits (e.g., 1, 2, or 4 bits) corresponding to the expression capability of the electrophotography technique. In step S775, the HT-processed signal modulates the main-scanning signal by PWM or the like, and the photoreceptor is exposed. In general, when the tone is expressed by 1 bit or 2 bits for each color, the amount of laser beams is assigned in the following manner:

in the case of 1 bit: 0 for no lighting (755), 1 for maximum lighting (754)

in the case of 2 bits: 0 for no lighting (755), 1 for very little lighting, 2 for medium lighting, 3 for maximum lighting (754)

In the CAD mode according to the present embodiment, instead of maximum lighting, for instance 80% light amount is selected (756) as the maximum density of the laser in either case of 1 bit or 2 bits.

Next, a color printer, a printer controller and a host computer (PC) which realize the above-described processing will be described.

First, the system block of the printer controller 200 is described with reference to FIG. 7. Color PDL data (including a mode command, e.g., CAD mode according to this embodiment) transmitted from a host computer 502 is stored in an input buffer 2. The input data is scanned by a PDL command analysis program 61 stored in a program ROM 6. A font ROM 3, storing bit patterns or outline data of a character, character base lines, and character matrix data, is used when texts are to be printed. A panel IOP 4 is an I/O processor and firmware for controlling detection of a switch input on a panel of the printer main unit or message display on an LCD. A low-cost CPU is employed as the panel IOP 4. An expansion I/F 5 serves as an interface circuit to a printer's expansion module (font ROM, program ROM, RAM, hard disk).

ROM 6 stores software for the printer according to the present invention. The CPU 12 reads and executes the data of the software. An administration RAM 7, serving as an area for administrating the software, stores a display list 71, global data and the like. The display list 71 is the inputted PDL data, which has been converted to an intermediate data format (page object) by the command analysis unit 61.

A color conversion hardware 8 performs color conversion from RGB (additive color mixture), which is the color system employed by monitors of normal work stations (WS) and personal computers (PC), to YMCK (subtractive color mixture) used in printer's ink processing. The conversion pursuing color precision requires a large operation power, e.g., nonlinear log conversion, calculation of the sum of products of the 3×3 matrix, and so forth. To achieve high-speed processing, table look-up and interpolation processing are performed in the hardware process. Parameters of the color conversion are adjusted most appropriately for a printer engine 100. If the host unit requests changes in the parameters or a color conversion method as a result of calibration or the like, it is possible to change the color conversion algorithm to a user-defined value by changing the table values. At the expense of processing time, software calculation can be performed using the CPU 12.

A hard renderer 9 performs real-time rendering in synchronization with video data transfer to the printer 100 (LBP), by executing color rendering processing with the ASIC hardware, thereby realizing a banding process with a small memory capacity.

A page buffer 10 stores image data developed in PDL. To realize the banding process (parallel execution of real-time rendering in band units and video data transfer to the printer), at least two bands of memory are necessary.

When banding cannot be performed because of the fact that real-time rendering cannot be performed, an apparatus such as an LBP, which requires to transfer image data in synchronization with the engine, must secure a full-color bitmap memory with a reduced resolution and/or color tone. However, in a case of an apparatus, such as the type discharging an ink droplet, which is capable of controlling the head movement by a printer controller, a minimum band of memory is required.

The dither pattern 15 stores a plurality of dither patterns for performing halftoning, which is the central feature of the present invention, by the hard renderer 9 at high speed. Pointers to the patterns that correspond to object types, which are designated by the host unit, are also stored. This processing will be described later in detail.

A printer interface 11 transfers contents of the page buffer 10 as video data to the color printer 100, e.g., LBP, in synchronization with horizontal/vertical synchronization signals of the printer. Alternatively, the printer interface 11 transfers video data corresponding to a head size having plural lines and head control in a bubble-jet (BJ) printer. The printer interface 11 also transmits commands to the printer or receives status data from the printer.

The CPU 12 controls processing inside the printer controller. The printer 100 is a color printer which performs printing based on a video signal outputted by the printer controller. The color printer may be of a color LBP employing an electrophotography method or an inkjet printer.

Figure 1:
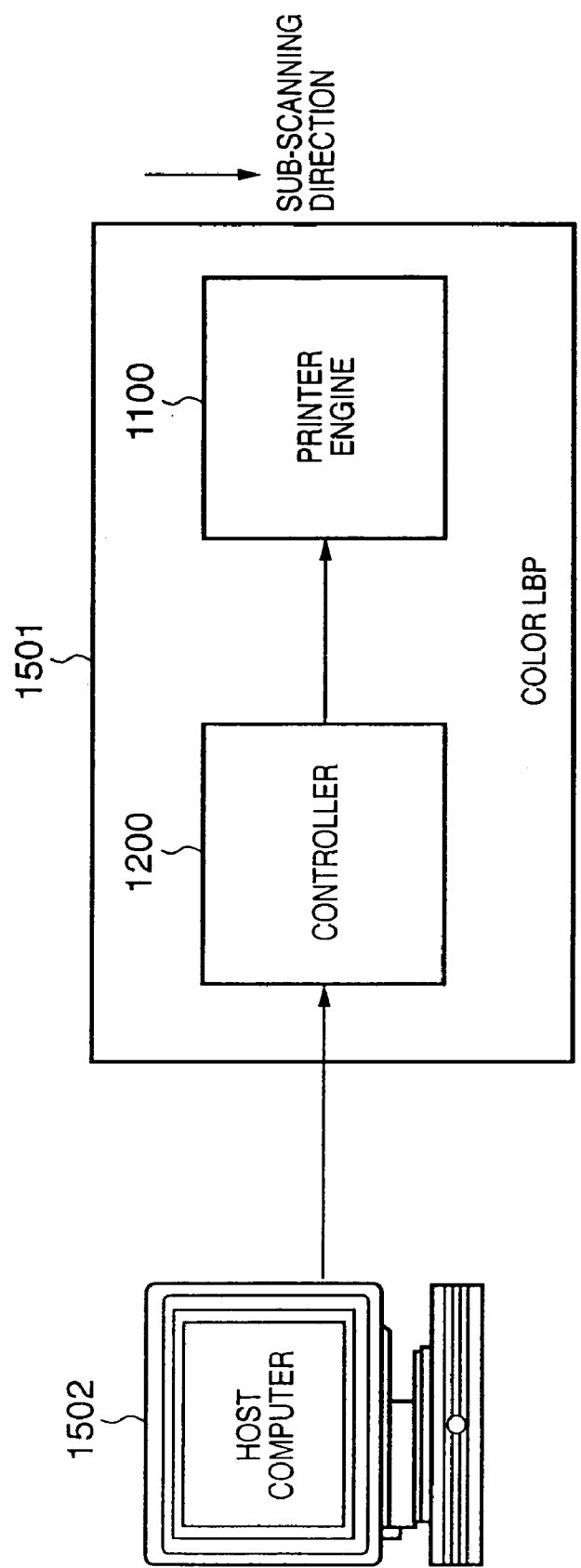
FIG. 1 is a diagram showing an overall construction of a printing system according to an embodiment of the present invention.

FIG. 1 shows an overall construction of the color LBP according to this embodiment. In FIG. 1, the color LBP 1501 receives code data described in a printer language and image data, transmitted from the host computer 502 serving as an external device, and forms a color image on printing paper (printing medium) based on the received data.

To be more specific, the color LBP 1501 is configured with the aforementioned printer controller 200 (hereinafter referred to as the controller) and the printer engine 100 (hereinafter referred to as the engine). The controller 200 generates multi-valued image data for one page, having magenta, cyan, yellow and black based on data inputted from the host computer 502, performs halftoning to reduce tones to respective PWM tone levels in units of respective color components, and outputs the data to the engine 100.

The engine 100 forms a latent image by scanning the photosensitive drum with a laser beam modulated in accordance with the image data generated by the controller 200. The engine 100 develops the latent image using toner, transfers it to printing paper, and fixes the toner to the printing paper, completing a series of electrophotography processes.

Figure 2:
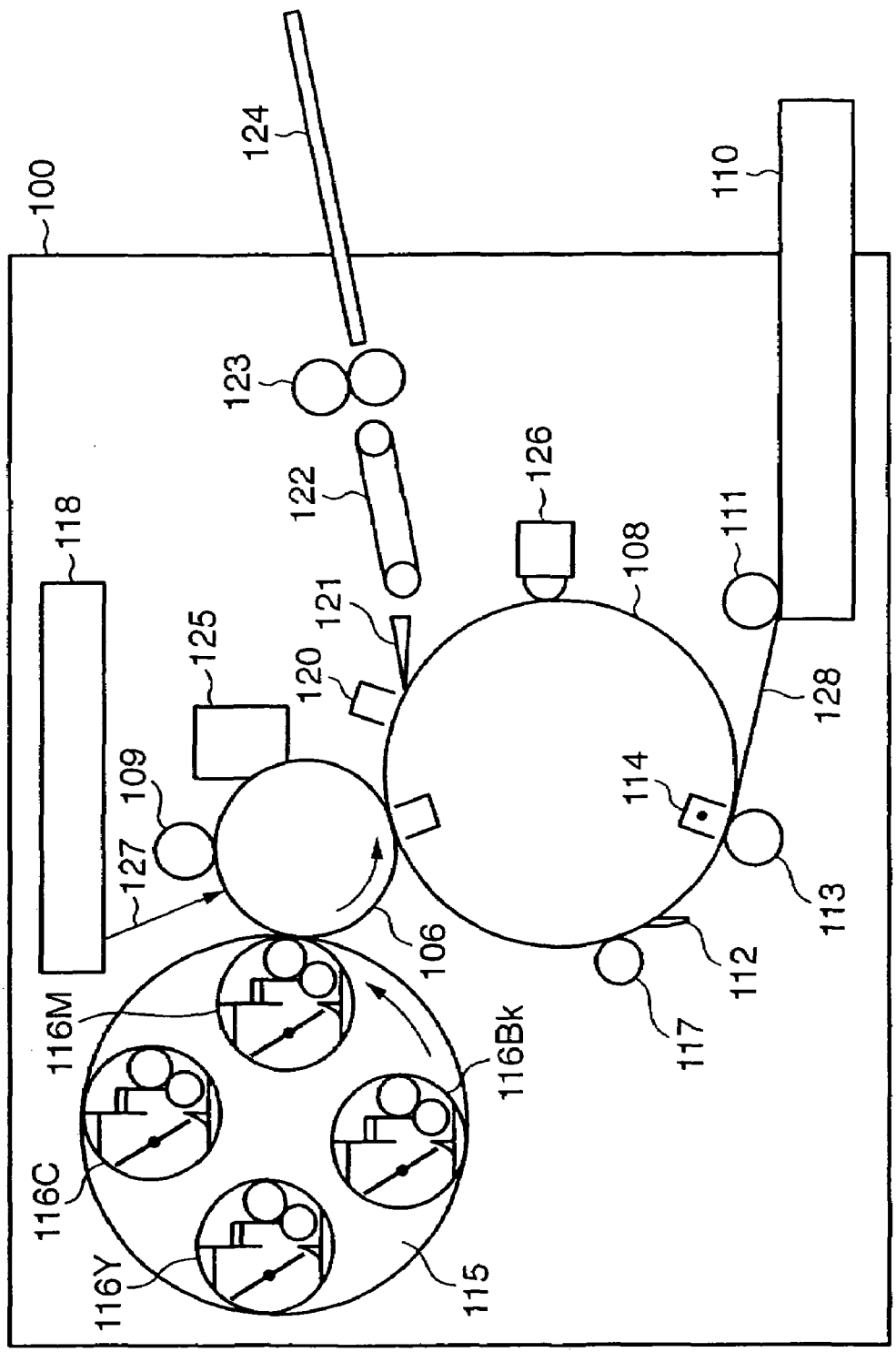
FIG. 2 is a diagram showing a configuration of a printer engine portion of the printing apparatus according to the embodiment.
Figure 3:
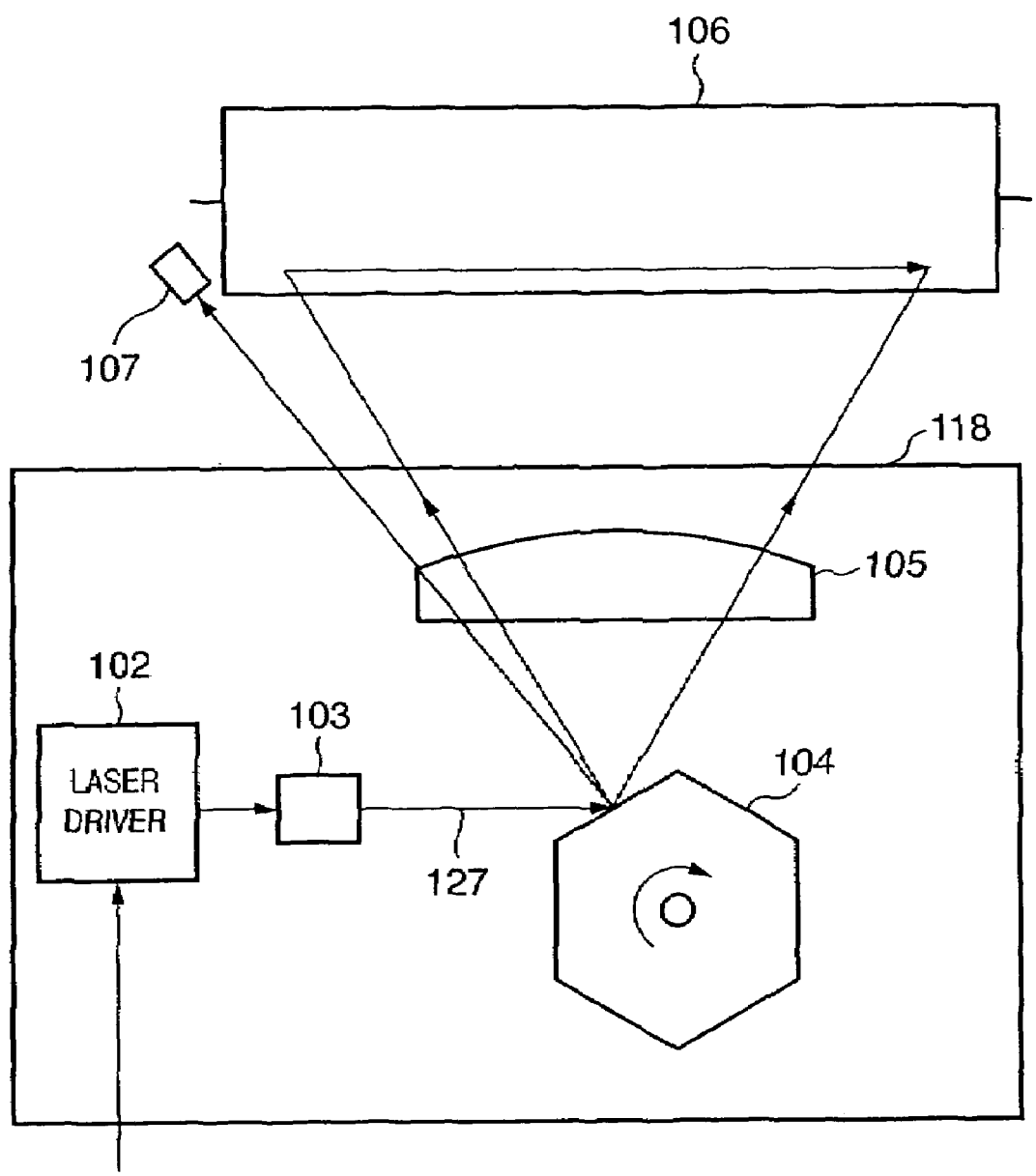
FIG. 3 is a diagram showing a configuration related to scanning and exposure in the printer engine shown in FIG. 2.

Note that the engine 100 has a resolution of 600 dpi. FIGS. 2 and 3 are block diagrams showing a detailed configuration of the engine 100. An operation of the engine 100 is described with reference to FIGS. 2 and 3.

In FIG. 2, the engine 100 rotates a photosensitive drum 106 and a transfer drum 108 in the arrow direction by driving means (not shown). Then, a roller electrostatic charger 109 is charged so that the surface potential of the photosensitive drum 106 is substantially uniformly charged to a predetermined value. A sheet-feeding roller 111 supplies printing paper 128, which is stored in a printing paper cassette 110, to the transfer drum 108. The transfer drum 108, which is a hollow supporting body having a dielectric sheet on its surface, is rotated in the arrow direction at the same speed as the photosensitive drum 106. The printing paper 128, supplied to the transfer drum 108, is held by a gripper 112 provided on the supporting body of the transfer drum 108, and attached to the transfer drum 108 by an attachment roller 113 and attachment charger 114. At the same time, a developer supporting unit 115 is rotated so that one of the four developers 116Y, 116M, 116C and 116K supported by the supporting unit 115 faces the photosensitive drum 106 to form a latent image. Note that 116Y, 116M, 116C and 116K are respectively developers holding yellow (Y) toner, magenta (M) toner, cyan (C) toner, and black (K) toner.

Meanwhile, the printer engine 100 detects the edge of the printing paper 128 attached to the transfer drum 106 by a paper edged detector 117, and transmits a control signal to the controller 200. Upon receiving the control signal, the controller 200 outputs a video signal (not shown) to a laser driver 102. The laser driver 102 causes the laser diode 103 to emit a laser beam 127 in accordance with the video signal. In this stage, the so-called Pulse Width Modulation (PWM) is realized by the laser driver 102 by controlling the laser lighting time as shown in FIG. 15 in accordance with an output condition, e.g., CAD mode, by the controller 200.

The laser beam 127 is deflected by a rotating polygon mirror 104, which is driven by a motor (not shown) in the arrow direction shown in FIG. 3, and scans the photosensitive drum 106 in the main-scanning direction through an image forming lens 105 that is arranged in the optical path, thereby forming a latent image on the photosensitive drum 106. In this stage, a beam detector 107 detects the scan starting point of the laser beam 127 and generates a horizontal synchronization signal. The latent image formed on the photosensitive drum 106 is developed by the developer, and transferred to the printing paper 128, which is attached to the transfer drum 108 by a transfer charger 119. The toner which is not transferred to the paper and remained on the photosensitive drum 106 is removed by a cleaning device 125. The aforementioned operation is repeated until a color toner image is transferred to the printing paper 128. The printing paper 128, on which all the toner images are transferred, is separated from the transfer drum 108 by a separation claw 121 through a detachment charger 120, and transmitted to a fixer 123 by a conveyance belt 122. In this stage, a transfer drum cleaner 126 cleans the surface of the transfer drum 108. The toner image on the printing paper 128 is dissolved and fixed by heat and pressure of the fixer 123 and becomes a full-color image. The printing paper 128, on which the full-color image is printed, is discharged to a discharge tray 124.

The system configuration of the host computer (WS, PC) according to this embodiment is described with reference to FIG. 4.

Figure 4:
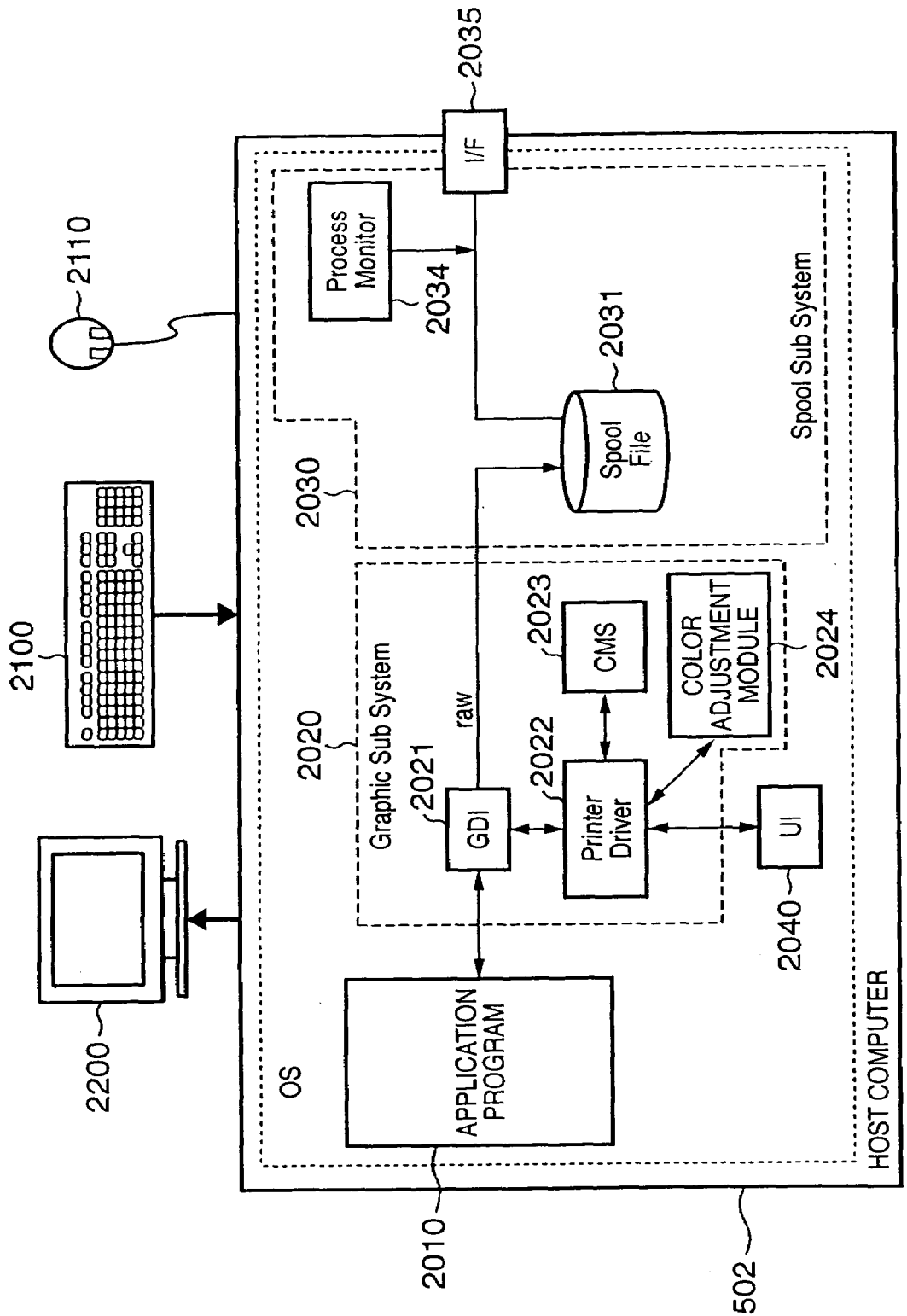
FIG. 4 is a block diagram showing respective functions of a host computer according to the embodiment.

In FIG. 4, a host computer 502 outputs print information, consisting of printing data and control codes, to the printer 100. The host computer 502 is a computer system including a keyboard 2100 serving as an input device, a mouse (registered trademark) 2110 serving as a pointing device, and a display monitor 2200 serving as a display device. Assume that the host computer 502 is operated by an OS, such as MS_DOS, Windows (registered trademark) or the like.

Herein, only the functions in the host computer related to the present invention are described. The functions of the host computer operating on the OS is largely classified into: an application program 2010; a graphics subsystem 2020 serving as image data processing means; a spool subsystem 2030 including data storage means, print data storage control means, and communication means for communicating with the printer; and an UI processor 2040.

The application program 2010 operates on basic software, such as a word processor, a spreadsheet, CAD or the like. The graphics subsystem 2020 is configured with a Graphic Device Interface (GDI) 2021 and a printer driver 2022 serving as a device driver dynamically linked by the GDI. The printer driver 2022 mainly serves to convert a rendering command, called as a GDI, to a PDL. When a GDI rendering command includes a color command or a halftoning command related to the present invention, a Color Management System (CMS) module 2023 performs appropriate processing.

The spool subsystem 2030 is a subsystem unique to a printer device, which is positioned subsequent to the graphics subsystem 2020. The spool subsystem 2030 is configured with a spool file 2031 (hard disk) serving as the first data storage means, and a process monitor 2034 which reads PDL codes stored in the spool file and monitors proceedings in the printer 100.

The UI processor 2040 utilizes functions provided by the OS to perform displaying of various menu buttons and analysis of user actions in order to determine parameters for controlling the printing quality, which is the main subject of the present invention.

Although aforementioned names and functional frameworks may differ depending on the OS, as long as the module can realize the respective technical means proposed by this embodiment, the difference in names and frameworks is not an issue.

For instance, a spooler or a spool file can be realized by incorporating the process into a module called a print queue in other OS. In general, the host computer 200, including the respective function modules, controls these modules using basic software operated on the hardware including a central processing unit (CPU), Read-only memory (ROM), random-access memory (RAM), a hard disk drive (HDD), and various input/output (IO) control units. The respective application software and subsystem processes operate as the function modules on the basic software.

Figure 8:
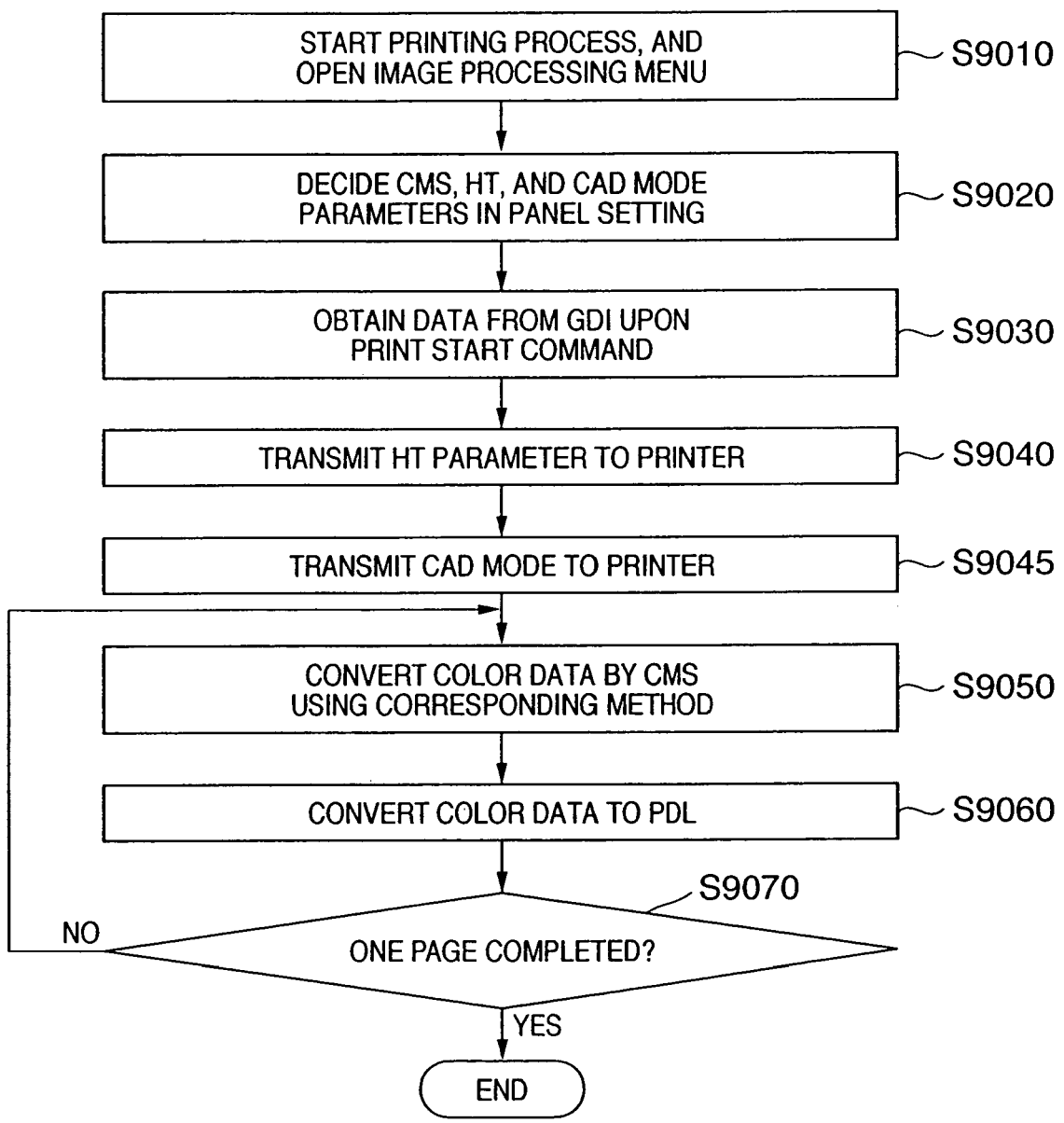
FIG. 8 is a flowchart showing a processing procedure of a printer driver in the host computer according to the embodiment.

Next, a processing procedure of a printer driver in the host computer is described with reference to the flowchart in FIG. 8.

First, the processing on the host computer side is mainly described. When printing menu is designated by a pointing device using an application program on a PC, a main sheet for printing is displayed for a user to select an output printer, a paper size, the number of copies, and image quality (step S9010).

Figure 9A:
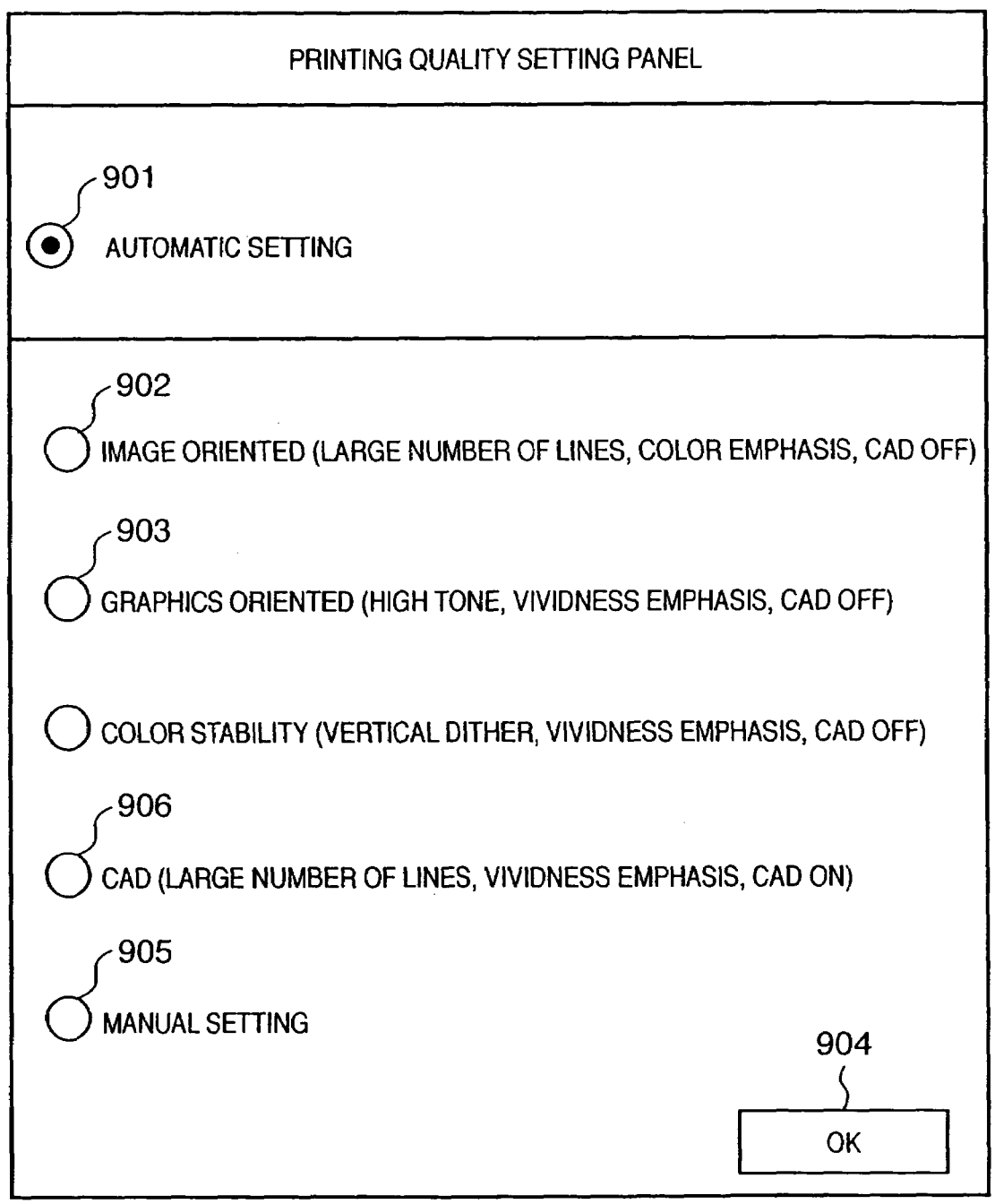
FIG. 9A shows an example of a graphical user interface (GUI) provided by a printer driver.

An example of the printing quality menu is shown in FIG. 9A. Initially, an automatic setting 901 is selected as default printing quality. To select other setting, a user can designate desired items by selecting the radio buttons shown in FIG. 9A using the pointing device 2110. In the automatic setting, Table 1 is selected for the color matching and Table 3 is selected for the halftoning with respect to each object type. The image orientation 902, graphics orientation 903, and CAD orientation 906 described in this embodiment, which determine the color processing parameters, halftoning, CAD mode ON/OFF (shown in the parentheses), are shown in a selected state. Depressing the OK button 904 designates the selected processing mode.

A user, who is not satisfied with the above-described setting, can depress a manual-setting button 905 to designate an arbitrary combination of color matching, halftoning, and CAD mode described in this embodiment.

Figure 9B:
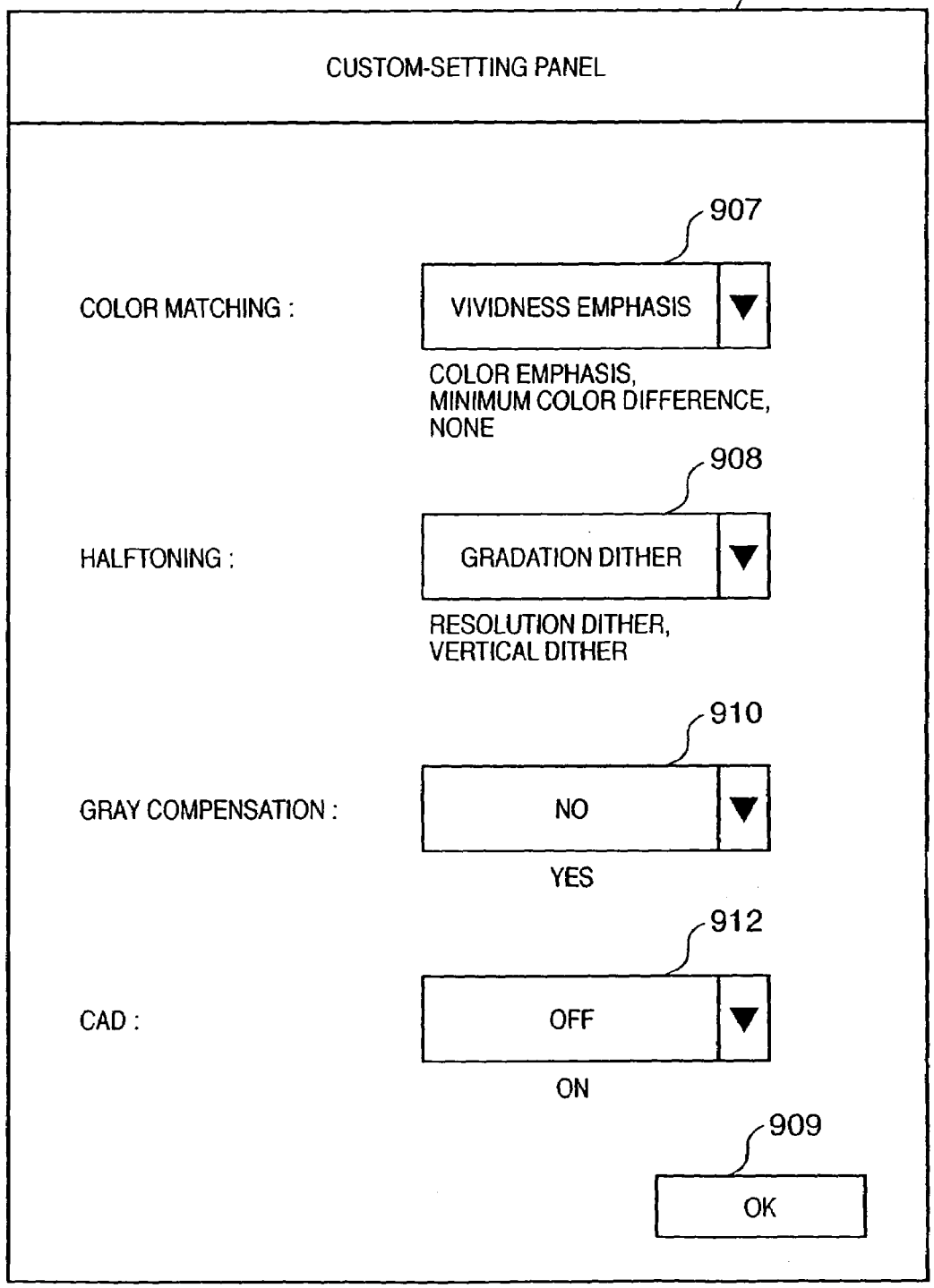
FIG. 9B shows an example of a graphical user interface (GUI) provided by a printer driver.

An example thereof is shown in FIG. 9B. A desired processing can be selected with respect to the color matching setting, halftoning, gray compensation, CAD mode and the like, using the combo box menus 907, 908, 910 and 912 shown in FIG. 9B. By depressing an arrow at the right end of the menu with a mouse, a list of processes supported by the system is displayed. A desired processing is selected by depressing the mouse again. Below the menus 907, 908, 910 and 912, other selectable parameters of setting quality are shown.

When the user depresses the OK button 909, the printer driver 2022 decides the color matching setting data for each object, halftoning method, and CAD-mode ON/OFF, and sets the designated information in the corresponding flags CMS_image_flag, CMS_text_flag, CMS_graphics_flag, HT_image_flag, HT_text_flag, HT_graphics_flag, and CAD_flag (step S9020). In the CAD mode herein, uniform processing is performed for all objects.

In the next step, when the user performs various setting and depresses the print OK button, the data rendered by the user is transferred to the printer driver 2022 through the GDI 2021 (step S9030).

With respect to color matching, the CMS module 2023 performs the actual color space compression processing. Halftoning and CAD mode processing are realized on the printer controller side. In the initial stage of a printing job, the printer driver 2022 transfers to the printer a Page Description Language (PDL) command or a Job Language (JL) command, representing the type of halftoning and CAD mode ON/OFF (steps S9040, S9045).

When the printer driver 2022 receives various rendering commands and color parameters in page unit from the GDI 2021, the current color data is stored in the buffer area. The printer driver 2022 transfers colors to be converted and the type of color space compression processing, which is designated by the CMS_*_flag set in step S9020 in accordance with the type of rendering objects (text, image or graphics), to the CMS module 2023 and receives the conversion result (step S9050**).

The printer driver 2022 converts the obtained color data, which has been converted, to a corresponding PDL command (step S9060). In case of a text or graphics, color space compression processing is executed for each object. In case of an image, since one object contains plural color data, color arrangement data is transferred to the CMS module 2023 and processing is performed altogether to improve processing efficiency.

The above-described process is repeatedly executed until color space compression with respect to the rendering objects are completed for one page (step S9070).

Since the overall processing flow in the printer according to the present embodiment has already been described, the following description will focus on halftoning, particularly dither processing.

To explain dither processing, first, the principle of a simple multivalue coding is described using a dither algorithm for quantizing 8-bit data (256 levels) to 2-bit data (4 values) that corresponds to a depth of density of the color component reproducible by a printer.

When an input value of the pixel of interest is less than 64, 0 (00 in binary numeration system) is outputted. When an input value is equal to or larger than 64 and less than 128, 85 (01 in binary numeration system) is outputted. When an input value is equal to or larger than 128 and less than 192, 170 (10 in binary numeration system) is outputted. When an input value is 255 or less, 255 (11 in binary numeration system) is outputted. This is shown in FIG. 10. Binarization is performed with the use of the threshold value (64, 128, 192) of each AREA and the end value of the AREA to which an input value belongs is outputted. The thick vertical lines in FIG. 10 indicate the area segmentation, and 8-bit or 2-bit output values are shown (in the parentheses) below each segmentation. The thin vertical lines indicate the threshold values in 8-bit level in the areas.

Figure 12:
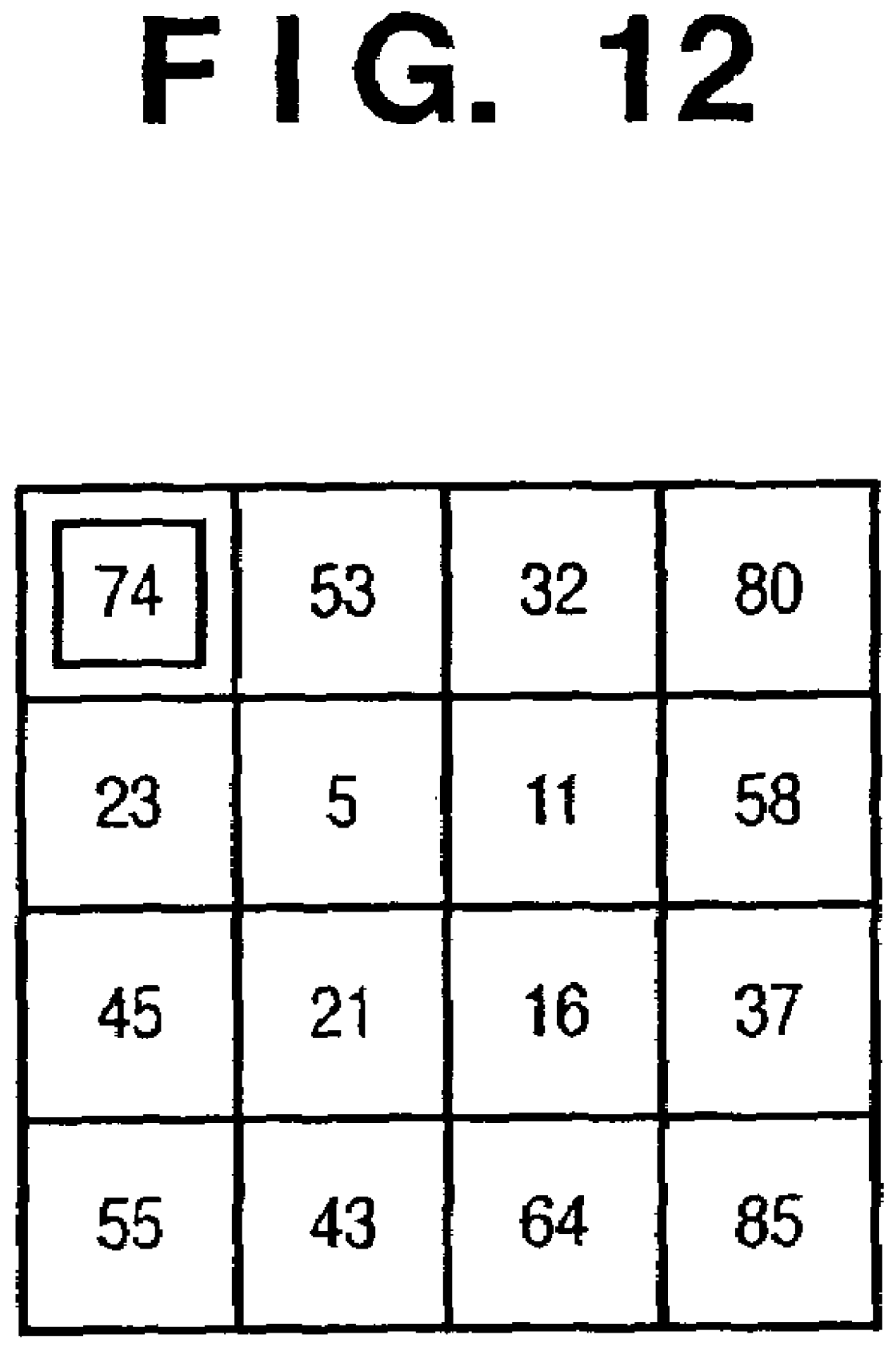

An example of applying the aforementioned binary processing to a multivalued dither is described with reference to FIGS. 11 and 12. Based on the pixel of interest data shown in FIG. 11 and a corresponding dither matrix value in FIG. 12, a threshold value appropriate for the area is calculated, and the pixel of interest data is binarized using the threshold value. The dither matrix having a 4×4 pattern is repeated in the page buffer. The maximum value of the dither matrix is 255/(bit level-1). The input data has been converted to a page memory resolution at the time of enlargement/reduction processing.

An actual dither algorithm is described in detail with reference to FIG. 11.

First, a pixel of interest in the input data is read, and it is determined which AREA the pixel of interest belongs to. Assume that the pixel of interest is "180". The value "180" belongs to AREA 2 in FIG. 10.

The corresponding dither matrix value is read, and the threshold value is changed to a value that matches AREA 2.

threshold value=74+85×2=244

If the pixel of interest data is equal to or larger than the threshold value, the maximum value of AREA 2 is outputted. If the pixel of interest data is less than the threshold value, the minimum value of AREA 2 is outputted. In this case, since pixel of interest (180)<threshold value (244) stands, the minimum value (170) of the AREA, i.e., 10, is outputted. The aforementioned process is repeated for each pixel.

The above conversion processing can be realized at high speed by hardware using a look-up table. The table, prepared in advance, stores 2-bit output values which are dither-converted at each position of the 4×4 dither matrix with respect to each of the input levels 0 to 255.

The table requires 1024 bytes for each of the Y, M, C and K components.

256×4×4×2 bits=1024 bytes

Figure 13A:
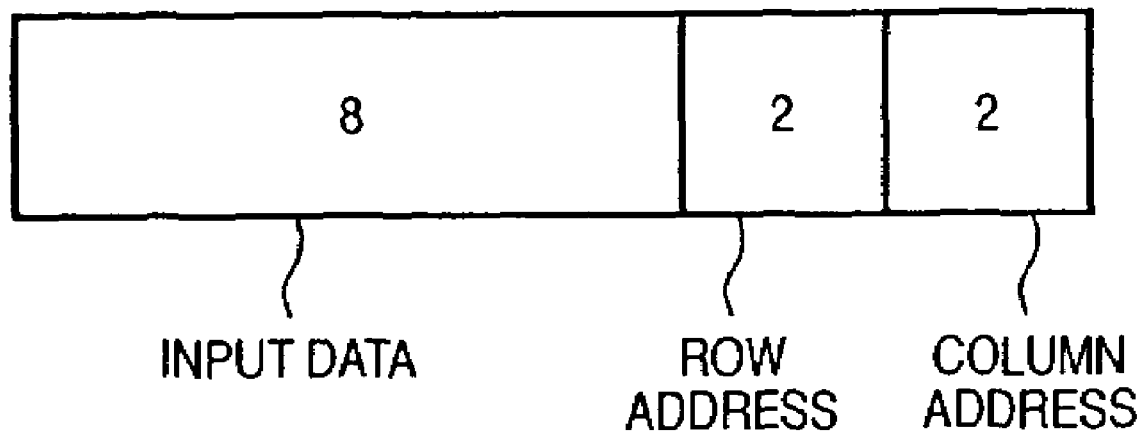
FIG. 13A shows a structure of a pointer used in the dither processing executed on input data according to the embodiment.

Table lookup is realized by accessing a 2-bit entry of the dither table in FIG. 13B, which is designated by a pointer shown in FIG. 13A.

The table size can express only one type of dither. In this embodiment, there are three types of objects (texts, images, graphics) at the maximum. Therefore, at least three times the size of memory must be secured.

When a print job is started, a PDL or JL command transmitted from the host computer 502 is analyzed, then a dither table 15 corresponding to respective rendering objects is generated, and links are formed between the object types and the table 15.

Each time a rendering object is inputted as PDL data, the current dither pointer is set in correspondence with the actual dither table 15, and rendering is executed by the hard renderer 9.

Second Embodiment

The first embodiment has described the CAD mode which can control the amount of laser beam emission at the maximum lighting (752 in FIG. 15). However, the first embodiment requires a hardware circuit.

In view of this, according to the second embodiment, in the graph showing a pulsewidth versus an amount of laser beams in FIG. 15, the maximum pulsewidth pattern is set at the pulsewidth (zone 2') that is 80% of the full pulsewidth of the characteristic curve 753, as indicated by the characteristic curve 752. Herein, if it is focused in dot unit, laser-off time is generated. However, it is considered that the laser-off time does not cause a significant difference since laser dullness, blurs in latent image formation and development, toner spattering and the like occur in the electrophotography process. Furthermore, in this case, a secondary color can be set up to 200% in color conversion.

Third Embodiment

The first embodiment realizes the CAD (thin-line emphasis) mode (using 80% of the amount of laser beams) and the conventional tonality emphasis mode (wide dynamic range using maximum laser lighting) by turning ON/OFF the CAD (thin-line emphasis) mode using the user I/F of the printer driver.

However, it may be cumbersome for a general user to switch the aforementioned two types of processing modes on a GUI. In view of this, according to the third embodiment, print data for one page is spooled by the host unit, and the printer driver in cooperation with the printer controller (200) realizes processing appropriate for the data without designation from a user interface (UI).

Figure 14:
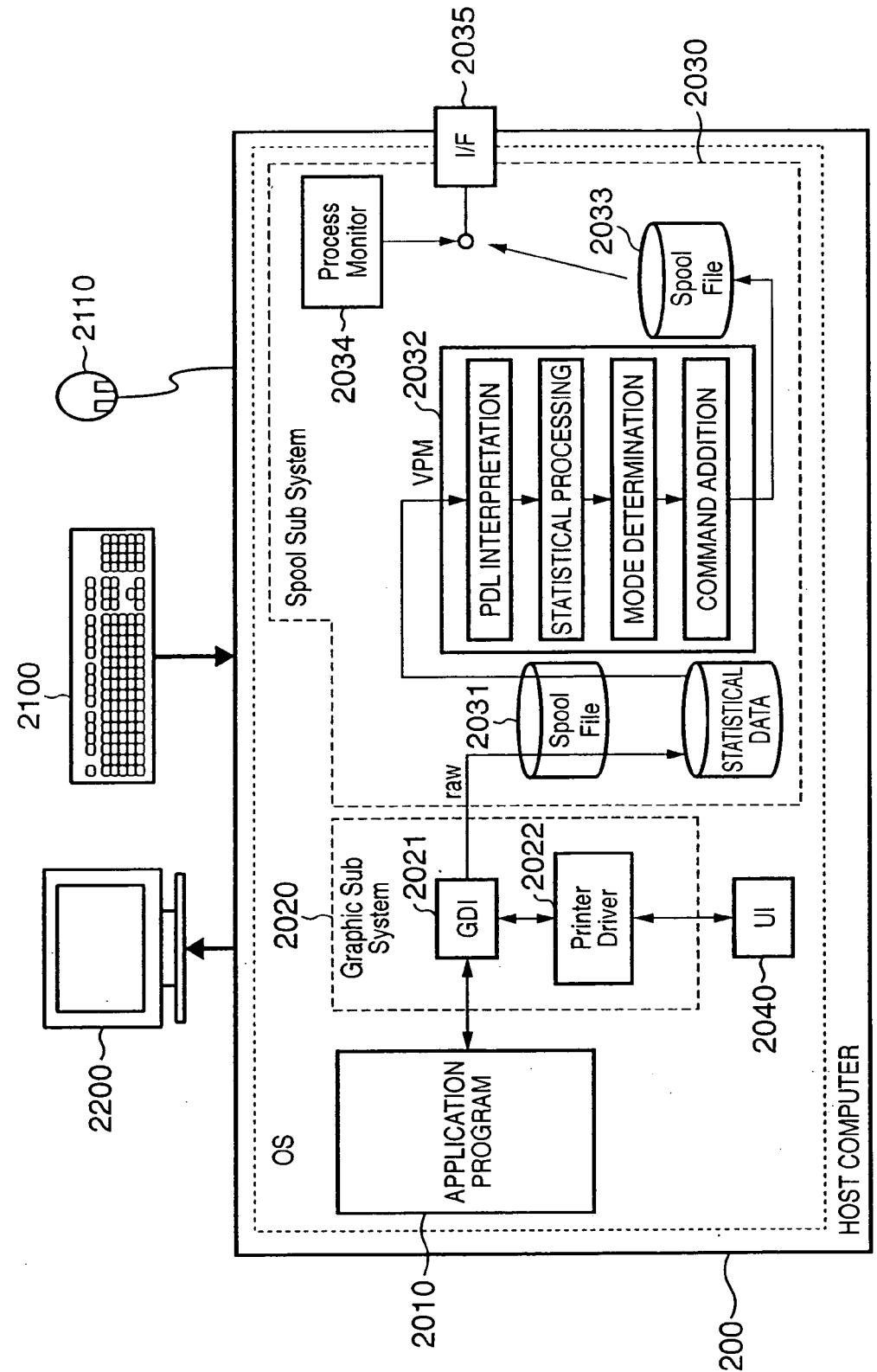
FIG. 14 is a block diagram showing respective functions of a host computer according to the third embodiment of the present invention.

FIG. 14 is a block diagram showing a host computer according to the third embodiment.

When an automatic determination mode is effective, the graphics subsystem 2020 counts the number of each type of rendering object outputted from a Graphics Device Interface (GDI) of Windows (registered trademark), and stores in page unit the number of rendering commands for each of the texts, images, and graphics (line) as statistical data (2037) in a spool file, separately from the objects that constitute the normal page. The spool subsystem 2030 determines based on the statistical data whether or not the data has many line rendering commands. If it contains many lines, the spool subsystem 2030 transmits a designation command to the printer controller 200 to turn on the CAD mode. This processing is performed in page unit in accordance with the statistics of objects in each page.

The printer controller 200 switches the CAD mode processing in page unit in accordance with the CAD-mode ON/OFF designation transmitted from the host in page unit.

Figure 17B:
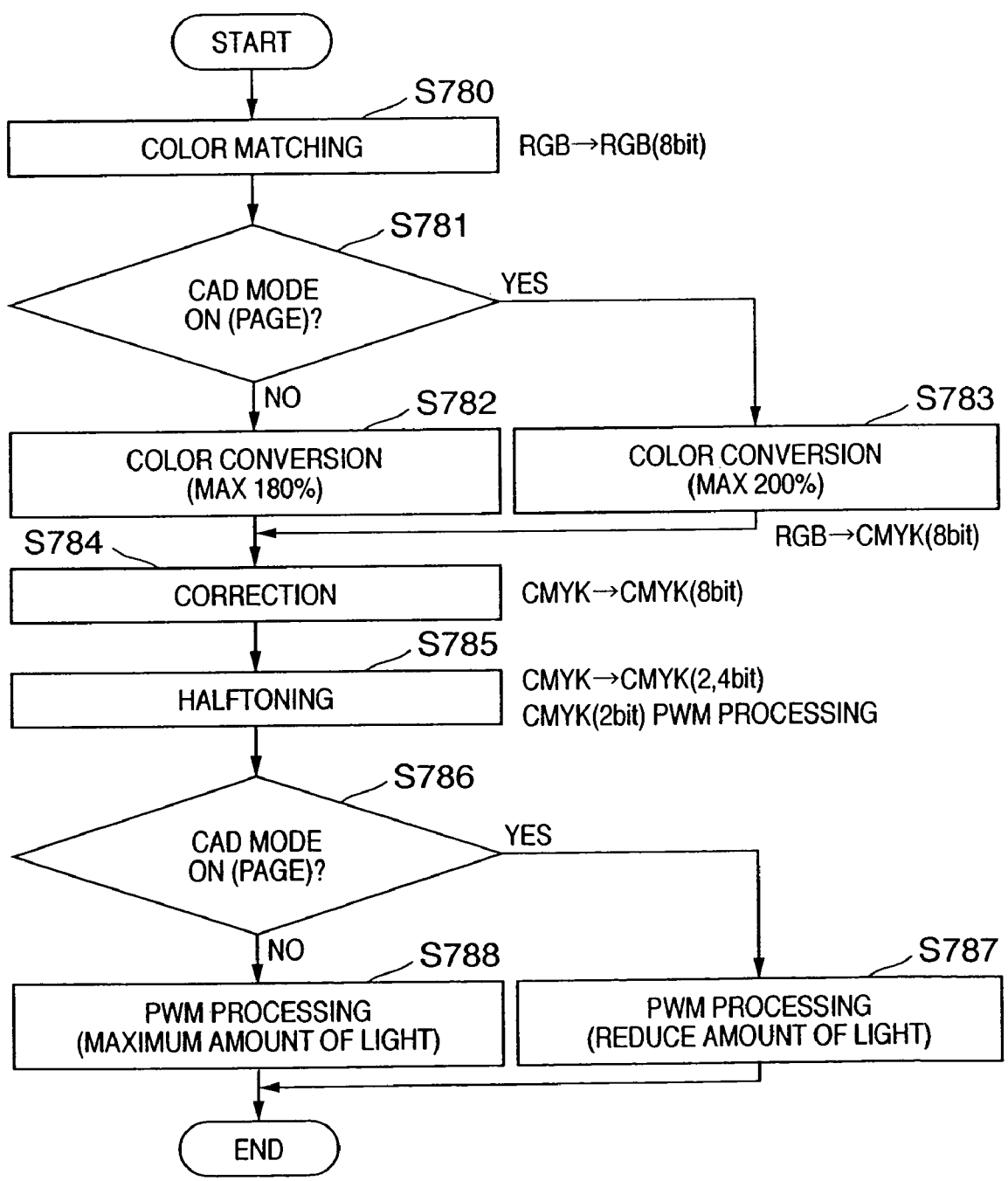
FIG. 17B is a flowchart showing a processing procedure of a printer controller according to the third embodiment.

More specifically, the functions or tables for color conversion and PWM processing are switched at the head of each page in accordance with the mode as shown in FIG. 17B.

|  | CAD mode ON | CAD mode OFF |
| --- | --- | --- |
| color conversion processing | MAX 200% toner adhesion (S783) | MAX 180% toner adhesion (S782) |
| PWM processing | reduced amount of light (S787) | maximum amount of light (S788) |

As a result, an appropriate mode setting is realized in page unit without any special operation.

Fourth Embodiment

In the foregoing embodiments, the CAD mode processing does not change in accordance with object types, but the same processing is performed for all objects in page unit. In the fourth embodiment, the CAD mode is changed for each object type, as similar to the color conversion and dither processing.

As will be shown below, it is considered ideal to eliminate a crack in thin lines of texts and graphics (CAD mode ON) and to emphasize tonality for images (CAD mode OFF). The algorithm for CAD mode ON has already been described in the above embodiments.

To realize this, the characteristic curve 753 in FIG. 15 is applied for texts and graphics, and the characteristic curve 751 in FIG. 15 is applied for images, thereby executing effective processing for each object type. Since it is difficult to change the amount of laser beams for each object in the analogue manner, the zones 1, 2 and 3 in FIG. 15 are used in the normal mode, and the zones 1 and 2' are used in the CAD mode.

Figure 17C:
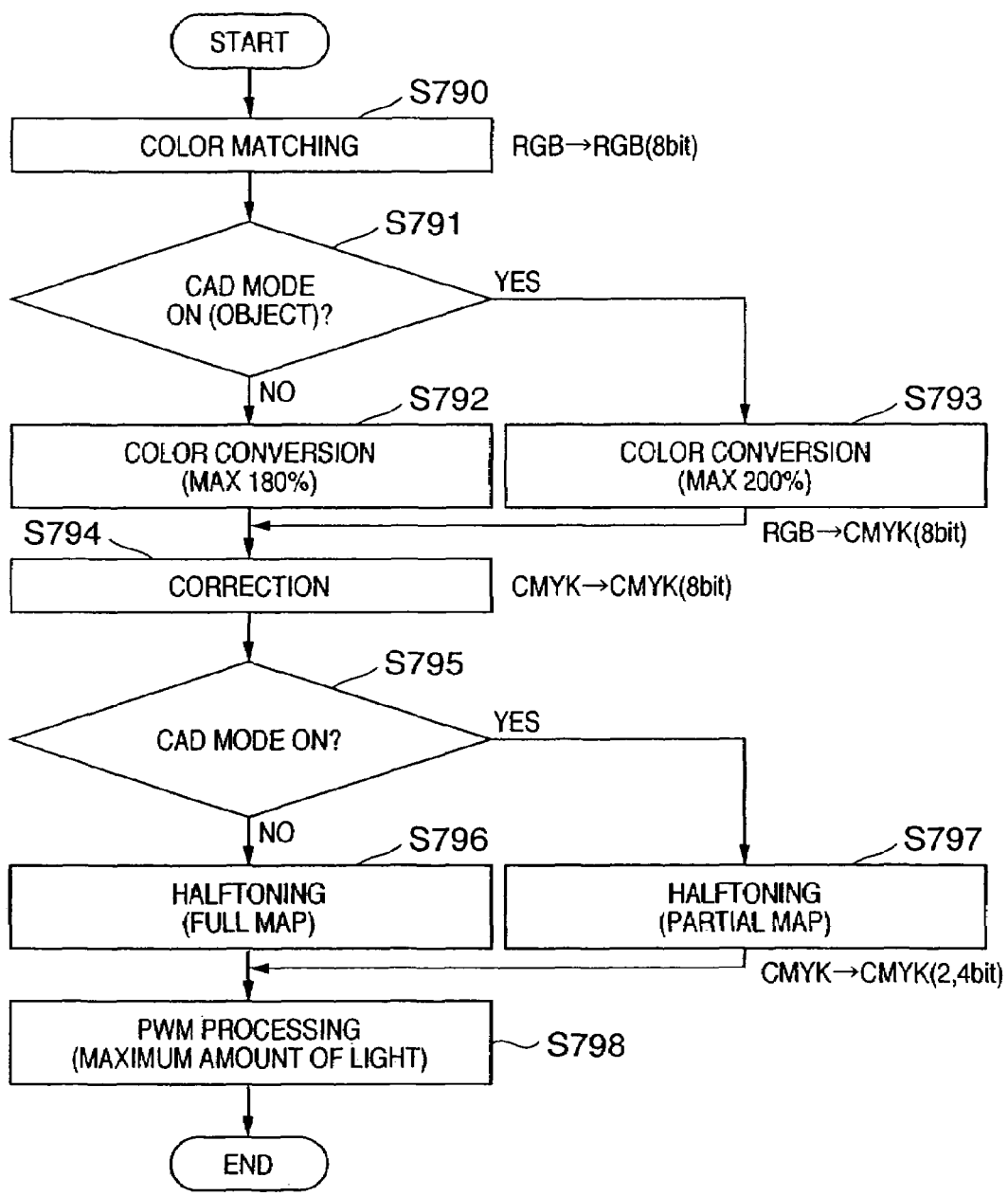
FIG. 17C is a flowchart showing a processing procedure of a printer controller according to the fourth embodiment.

More specifically, as shown in FIG. 17C, when halftoning (HT) is performed, the CAD mode is determined in step S795. If the CAD mode is ON (step S797), the 255-level (MAX) value of YMCK is mapped to the MAX value of the zone 2'.

If the CAD mode is OFF (step S796), the 255-level (MAX) value of YMCK is mapped to the maximum value.

Accordingly, CAD mode processing according to object types can be realized.

TABLE 4

| | |
|---|---|
| texts | CAD ON |
| graphics | CAD ON |
| images | CAD OFF |

Embodiments of the present invention have been described above in detail. The present invention is not limited to the above-described embodiments. For instance, although a printer connected to a host computer has been described as an example, the present invention may be of a type connected to a network, or may be applied to a device such as a copying machine. Furthermore, the printing method is not limited to a laser beam, but may be of a method employing an LED array or the like.

Furthermore, although the foregoing embodiments have described that the amount of exposure light is controlled to 90% in the CAD mode, the present invention is not limited to this value. As long as toner spattering is prevented, the amount of light may differ for each machine. The amount of light may be adjusted to 91% for some device or 88% for other device.

As has been set forth above, according to the embodiments described above, it is possible to prevent a crack in a line, which has been a conventional problem when a line is printed, while controlling the toner adhesion amount in image processing. As a result, it is possible to obtain an image as desired by a user.

According to the present invention, even in a case of printing an image with texts and thin lines, it is possible to print the image with an intended thickness without causing a crack in the line.

The present invention is not limited to the above embodiment and various changes and modifications can be made within the spirit and scope of the present invention. Therefore, to apprise the public of the scope of the present invention, the following claims are made.

What is claimed is:

1. A control method of an image forming apparatus which forms a color image on a predetermined printing medium by an electrophotography method, comprising:
   a first image forming step of forming an image by performing halftoning while reducing a pixel value indicative of a printing color component at a predetermined rate;
   a second image forming step of forming an image by performing halftoning without reducing a pixel value indicative of a printing color component, while reducing an amount of exposure light used in the electrophotography method at a predetermined rate;
   a determining step of determining whether or not a thin-line-emphasis image forming is designated; and
   a control step of controlling the apparatus to perform image forming by either said first image forming step or said second image forming step, based on a determination result of said determining step.

2. The control method of an image forming apparatus according to claim 1, said apparatus receiving printing data from an external host computer,
   wherein in said determining step, determination is made based on a predetermined command included in the printing data.

3. The control method of an image forming apparatus according to claim 2, wherein in said determining step, determination is made in page unit.

4. The control method of an image forming apparatus according to claim 2, wherein in the host computer, a printer driver started upon a printing operation is installed, and the thin-line emphasis is selected in a setting screen of the printer driver.

5. The control method of an image forming apparatus according to claim 2, wherein in the host computer, a printer driver started upon a printing operation is installed, data transferred from an upper process is analyzed, statistical data is taken for each type of data in page unit, and in a case where it is determined that the data includes many thin lines and small texts, a command designating a thin-line emphasis mode is automatically generated without user's designation, otherwise a command designating a non thin-line emphasis mode is generated.

6. The control method of an image forming apparatus according to claim 2, wherein a thin-line emphasis mode or a non thin-line emphasis mode can be switched in accordance with the type of objects.

7. An image forming apparatus which forms a color image on a predetermined printing medium by an electrophotography method, comprising:
   first image forming means for forming an image by performing halftoning while reducing a pixel value indicative of a printing color component at a predetermined rate;
   second image forming means for forming an image by performing halftoning without reducing a pixel value indicative of a printing color component, while reducing an amount of exposure light used in the electrophotography method at a predetermined rate;
   determining means for determining whether or not a thin-line-emphasis image forming is designated; and
   control means for controlling said apparatus to perform image forming by either said first image forming means or said second image forming means, based on a determination result of said determining means.

8. The image forming apparatus according to claim 7, said apparatus receiving printing data from an external host computer,
   wherein said determining means makes determination based on a predetermined command included in the printing data.

9. The image forming apparatus according to claim 8, wherein said determining means makes determination in page unit.

10. The image forming apparatus according to claim 8, wherein in the host computer, a printer driver started upon a printing operation is installed, and the thin-line emphasis is selected in a setting screen of the printer driver.

11. The image forming apparatus according to claim 8, wherein in the host computer, a printer driver started upon a printing operation is installed, data transferred from an upper process is analyzed, statistical data is taken for each type of data in page unit, and in a case where it is determined that the data includes many thin lines and small texts, a command designating a thin-line emphasis mode is automatically generated without user's designation, otherwise a command designating a non thin-line emphasis mode is generated.

12. The image forming apparatus according to claim 8, wherein a thin-line emphasis mode or a non thin-line emphasis mode can be switched in accordance with the type of objects.

* * * * *

UNITED STATES PATENT AND TRADEMARK OFFICE
CERTIFICATE OF CORRECTION

| | |
|---|---|
| PATENT NO. | : 7,038,707 B2 |
| APPLICATION NO. | : 10/736628 |
| DATED | : May 2, 2006 |
| INVENTOR(S) | : Haruo Shimizu |

It is certified that error appears in the above-identified patent and that said Letters Patent is hereby corrected as shown below:

COVER PAGE:
(57) ABSTRACT
Line 13, "components," should read -- component, --.

COLUMN 1:
Line 30, "electrophotography" should read -- the electrophotography --.

COLUMN 2:
Line 7, "comprising" should read -- comprises --.

COLUMN 10:
Line 53, "OS is" should read -- OS are --.

COLUMN 11:
Line 35, "printing" should read --a printing --; and
Line 42, "setting," should read -- settings, --.

COLUMN 12:
Line 9, "setting" should read -- settings --; and
Lines 32 and 33, "in case" should read -- in the case --.

COLUMN 15:
Line 38, "device" should read -- devices --;
Line 39, "device." should read -- devices. --; and
Line 51, "ment" should read -- ments --.

COLUMN 16:
Lines 31 and 35, "non thin-line" should read -- non-thin-line --.

UNITED STATES PATENT AND TRADEMARK OFFICE
CERTIFICATE OF CORRECTION

PATENT NO. : 7,038,707 B2
APPLICATION NO. : 10/736628
DATED : May 2, 2006
INVENTOR(S) : Haruo Shimizu It is certified that error appears in the above-identified patent and that said Letters Patent is hereby corrected as shown below:

COLUMN 18:
Line 1 and 4, "non thin-line" should read -- non-thin-line --.

Signed and Sealed this

Twelfth Day of December, 2006

JON W. DUDAS
*Director of the United States Patent and Trademark Office*